US009249251B2

(12) United States Patent
Viswanathan et al.

(10) Patent No.: US 9,249,251 B2
(45) Date of Patent: Feb. 2, 2016

(54) COMPOSITIONS AND METHODS TO PRODUCE TRIAZINE-ARYLHYDROXY-ALDEHYDE CONDENSATES WITH IMPROVED SOLUBILITY

(75) Inventors: Ganapathy S. Viswanathan, Louisville, KY (US); Raman C. Subrayan, Louisville, KY (US); Vinay Malhotra, Louisville, KY (US)

(73) Assignee: HEXION INC., Columbus, OH (US)

( * ) Notice: Subject to any disclaimer, the term of this patent is extended or adjusted under 35 U.S.C. 154(b) by 278 days.

(21) Appl. No.: 12/858,096

(22) Filed: Aug. 17, 2010

(65) Prior Publication Data

US 2012/0046424 A1 Feb. 23, 2012

(51) Int. Cl.
| C08G 14/10 | (2006.01) |
| C08G 73/06 | (2006.01) |
| C08L 61/00 | (2006.01) |
| C08L 61/06 | (2006.01) |
| C08L 63/00 | (2006.01) |
| C08L 61/34 | (2006.01) |
| C08G 59/62 | (2006.01) |
| C08G 59/68 | (2006.01) |

(52) U.S. Cl.
CPC .............. *C08G 14/10* (2013.01); *C08G 59/623* (2013.01); *C08G 59/68* (2013.01); *C08L 61/34* (2013.01)

(58) Field of Classification Search
CPC ....................................................... C08G 14/10
USPC ......................................................... 525/523
See application file for complete search history.

(56) References Cited

U.S. PATENT DOCUMENTS

| 3,293,212 | A |   | 12/1966 | Power et al. |
| 3,321,551 | A |   | 5/1967 | Knutsson |
| 3,364,167 | A |   | 1/1968 | Imai et al. |
| 3,867,346 | A |   | 2/1975 | Vargiu et al. |
| 4,268,683 | A | * | 5/1981 | Gurgiolo ........................ 560/24 |
| 5,034,527 | A |   | 7/1991 | Brown et al. |
| 5,910,521 | A | * | 6/1999 | Johnson et al. ............... 523/145 |
| 5,952,447 | A |   | 9/1999 | Ikeda |
| 5,955,184 | A |   | 9/1999 | Honda et al. |
| 6,239,248 | B1 |   | 5/2001 | Gerber |
| 6,392,003 | B1 |   | 5/2002 | Kiuchi et al. |
| 6,500,545 | B1 |   | 12/2002 | Ambrose et al. |
| 6,515,047 | B2 |   | 2/2003 | Fukuzawa et al. |
| 6,558,797 | B1 | * | 5/2003 | Arata et al. .................... 428/418 |
| 6,605,354 | B1 |   | 8/2003 | Gerber |
| 7,411,013 | B2 | * | 8/2008 | Harashina et al. ............. 524/117 |
| 2002/0058735 | A1 |   | 5/2002 | Galbo et al. |
| 2003/0148109 | A1 |   | 8/2003 | Timberlake et al. |
| 2003/0224176 | A1 |   | 12/2003 | Gerber |
| 2005/0003202 | A1 |   | 1/2005 | Gerber |
| 2008/0241578 | A1 | * | 10/2008 | Lin et al. ....................... 428/626 |
| 2009/0054614 | A1 |   | 2/2009 | Eguchi et al. |

FOREIGN PATENT DOCUMENTS

| CN | 1266859 | 9/2000 |
| CN | 1803873 | 7/2006 |
| EP | 0877040 | 11/1998 |
| EP | 0913413 | 5/1999 |
| JP | H03243613 | 10/1991 |
| JP | 11279247 | 10/1999 |
| JP | 11279248 | 10/1999 |
| JP | 2001139666 | 5/2001 |
| JP | 2001164256 | 6/2001 |
| JP | 2004292791 | 10/2004 |
| JP | 2006077154 | 3/2006 |
| WO | WO0009579 | 2/2000 |
| WO | WO0025998 | 5/2000 |
| WO | WO0194435 | 12/2001 |

OTHER PUBLICATIONS

Shieh, J.-Y. and Wang, C.-S., Synthesis of Novel Flame Retardant Epoxy Hardeners and Properties of Cured Products, Polymer., 2001, pp. 7617-7625, No. 52, Elsevier Science Ltd.
Subrayan, Ramachandran et al., Condensation of Substituted Phenols with Hexakis(methoxymethyl) melamine . . . Chem. Mater., 1998, pp. 3506-3512, vol. 10, No. 11, American Chemical Society.
Braun D. et al., "Gemeinsame Kondensation von Phenol, Melamin, und Formaldehyd. I. Modellreaktionen", Angewandte Makromolekulare Chemie., 1982, pp. 141-159, vol. 108, No. 1, Wiley VCH, Weinheim, D.E.
Maciejewski, M. et al., "Highly Branched Melamine-Phenolic Novolaks", Polymer Bulletin, 2001, pp. 251-259, vol. 48, No. 3, Springer, Heidelberg, DE.

* cited by examiner

*Primary Examiner* — David Karst

(57) ABSTRACT

Compositions and methods for forming condensates and resin compositions are provided. In one embodiment, a condensate is formed from a reaction mixture including a triazine monomer, an arylhydroxy monomer, an aldehyde monomer and an acid catalyst having a pKa value of greater than 3.8. The condensates contain up to 28 wt. % of nitrogen and have a melt viscosity of 3,000 cps or less at 175° C. The condensates may have a solubility of at least 80 wt. % solids dissolved in an organic solvent for 120 hours or greater. Also disclosed are methods for the manufacture of the condensate as well as the condensate's use in fire-retardant epoxy resin compositions suitable for the manufacture of laminates for electronic applications. There is also disclosed a glycidylated triazine-arylhydroxy-aldehyde condensate of this invention.

24 Claims, No Drawings

COMPOSITIONS AND METHODS TO PRODUCE TRIAZINE-ARYLHYDROXY-ALDEHYDE CONDENSATES WITH IMPROVED SOLUBILITY

FIELD OF THE INVENTION

The present invention relates to compositions for use with epoxy and other resins, to methods for their preparation, and processes for using the same. In particular, the present invention relates to triazine-arylhydroxy-aldehyde condensates having improved solubility in solvents that are formed using an acid catalyst having a pKa value of greater than 3.8.

BACKGROUND OF THE INVENTION

Epoxy resins have excellent moisture, solvent, chemical and heat resistance properties, good adhesion, and superior mechanical and electrical properties, which make epoxy resins suitable for use in constructing and packaging electronic products. In many cases, flame retardant materials are included in the epoxy resin compositions for use in electronic applications and/or electronic components that require high flame retardancy.

In one approach, the flammability of the epoxy resin can be reduced by physically blending a flame-retardant additive with the epoxy resin. Some examples of such additive-type flame retardants include antimony trioxide, aluminum trihydroxide, elemental phosphorous, and inorganic phosphorous compounds. Unfortunately, such additive-type flame retardants may be toxic. Additionally, such additive-type flame retardants may be difficult to integrate with the epoxy compositions, thereby, necessitating a high initial loading of the additive-type flame retardants that adversely influences the electrical or mechanical properties of the epoxy resin.

One commonly used flame-retardant in epoxy compositions for printed wiring boards (PWB) in electronic equipment is a halogenated aromatic flame-retardant, such as a brominated aromatic flame-retardant. The brominated aromatic flame-retardant, for example, tetrabromobisphenol A (TBBPA) based compounds, chemically bond with the polymer chain. Unfortunately, such halogenated aromatic flame-retardant may emit corrosive halides and toxic compounds during a fire. Additionally, there has been an increased global interest in environmental protection leading to a higher demand for halogen-free flame-retardants (HFFR) in the epoxy formulations for PWB.

Alternatively, phosphorous or nitrogen containing epoxies and/or epoxy curatives as flame retardants have been considered for improving flame retardancy. Unfortunately, relatively large quantities of phosphorous-based compounds are needed to provide for sufficient flame-retardancy, which quantities have been observed to greatly reduce heat and moisture resistance of the epoxy resins.

Nitrogen-based flame retardants are considered advantageous as they are observed to have a low toxicity, are physically stable, and in case of fire, have an absence of toxic and corrosive emissions with a low evolution of smoke. More recently, triazine-phenol-aldehyde (TPA) condensates have been described as flame retardant additives for epoxy resins. TPA condensates with high nitrogen content are also effective curing agents for epoxy resins leading to high efficiency in flame retardancy without compromising the mechanical and physical properties of the polymer.

However, one difficulty with TPA condensates is that the current condensate compositions exhibit higher viscosity and lower nitrogen content than desired. For example, existing processes typically produce an atomic nitrogen content of only about 1 to 10 wt. %. TPA condensates have also been observed to exhibit instability at higher temperatures that limit the large scale manufacturing of such condensates.

Conventional processes for forming TPA condensates have been found to be disadvantageous as the resulting condensates exhibited an undesirable increase in viscosity and also exhibited a decreased solubility in commons solvents, such as methyl ethyl ketone (MEK) and acetone, typically used in epoxy formulations. The solubility of the TPA condensates in such solvents is important since residues or insolubles in the epoxy resins may result in less than desirable coating of substrates and degrade the quality of the laminates made from the epoxy resins.

Other conventional TPA condensate formation processes prepare compounds with large amounts of methanol as a reactant, which present special challenges on commercial scale productions including handling, waste, and expense.

Therefore, there is a need for forming flame-retardant condensates, with improved viscosity and improved solubility that are effective curing agents, provide fire-retardant properties to epoxy compositions and which may be manufactured on a commercial scale.

SUMMARY OF THE INVENTION

Embodiments of the invention are directed to condensates, methods for making the condensates, and application of the condensates in epoxy resins, prepregs of a porous substrate, and laminates. In one aspect, the present invention provides for a condensate product formed from a reaction mixture of a triazine monomer, an arylhydroxy monomer, an aldehyde monomer, and an acid catalyst having a pKa value range from greater than 3.8 to about 11, wherein the condensation product comprises up to about 28 wt. % of nitrogen, a melt viscosity of less than 3,000 cps at 175° C., and a solubility of up to at least about 80 wt. % solids dissolved for 120 hours or greater in one or more organic solvents having one or more functionalities selected from the group consisting of an ether functionality, a ketone functionality, an alcohol functionality, an ester functionality, and combinations thereof. The condensates described herein may be substantially free of water and may have about 2 wt. % or less of free arylhydroxy monomer. The triazine monomer and the aldehyde monomer may comprise an aldehyde modified triazine monomer.

In another aspect, the present invention provides for a flame-retardant epoxy resin composition including an epoxy resin and a triazine-arylhydroxy-aldehyde condensate of a reaction mixture including a triazine monomer, an arylhydroxy monomer, an aldehyde monomer, and an acid catalyst having a pKa value range from greater than 3.8 to about 11, wherein the triazine-phenol-aldehyde condensate comprises up to about 28 wt. % of nitrogen, a melt viscosity of less than 3,000 cps at 175° C., and a solubility of up to at least about 80 wt. % solids dissolved for 120 hours or greater in one or more organic solvents having one or more functionalities selected from the group consisting of an ether functionality, a ketone functionality, an alcohol functionality, an ester functionality, and combinations thereof.

In another aspect, the present invention provides a method for the preparation of a condensate product including charging to a reaction vessel to form a reaction mixture a triazine monomer, from about 3 to about 30 moles of an arylhydroxy monomer for each mole of triazine monomer, from about 1 to about 6 moles of an aldehyde monomer for each mole of triazine monomer, and an acid catalyst having a pKa from greater than 3.8 to 11, heating the reaction mixture to a temperature of about 120° C. to about 165° C. and substantially completing reaction of arylhydroxy monomer in the reaction mixture.

In yet another aspect of this invention, the triazine-phenol-aldehyde condensate as described herein, either alone or in admixture with another epoxy curing agent and/or another fire-retardant, may be used as a fire-retardant curing agent for epoxy resins.

In another aspect, a prepreg of a porous substrate is provided and includes a curable epoxy resin and a condensate of a reaction mixture a triazine monomer, an arylhydroxy monomer, an aldehyde monomer and an acid catalyst having a pKa of greater than 3.8 as the curing agent alone or in combination with another curing agent.

In another aspect, a laminate is provided including one or more prepregs impregnated with an epoxy resin and a condensate of a reaction mixture a triazine monomer, a phenol monomer, an aldehyde monomer and an acid catalyst having a pKa of greater than 3.8 alone or together with another curing agent wherein the epoxy resin composition is cured.

In another aspect, a glycidylated triazine-phenol-aldehyde condensate is provided in a reaction mixture, wherein the condensate prior to glycidylation is a reaction mixture comprising a triazine monomer, a phenol monomer, an aldehyde monomer and an acid catalyst having a pKa value range from greater than 3.8, and comprises up to about 28 wt. % of nitrogen, a melt viscosity of less than 3,000 cps at 175° C., and a solubility of up to about 80 wt. % solids dissolved for 120 hours or greater in one or more organic solvents having one or more functionalities selected from the group consisting of an ether functionality, a ketone functionality, an alcohol functionality, an ester functionality, and combinations thereof.

In another aspect, a composition suitable for electronic applications is provided and includes an epoxy resin wherein for each 100 parts of epoxy resin the composition contains about 0-30 parts of a phenolic-formaldehyde novolac, optionally an epoxy curing accelerator, and about 30 to 60 parts of a triazine-phenol-aldehyde condensate in a reaction mixture comprising a triazine monomer, a phenol monomer, an aldehyde monomer, and an acid catalyst having a pKa value range from greater than 3.8 to about 11, wherein the triazine-phenol-aldehyde condensate and comprises up to about 28 wt. % of nitrogen, a melt viscosity of less than 3,000 cps at 175° C., and a solubility of up to at least about 80 wt. % solids dissolved for 120 hours or greater in one or more organic solvents having one or more functionalities selected from the group consisting of an ether functionality, a ketone functionality, an alcohol functionality, an ester functionality, and combinations thereof.

In another aspect, a method for the preparation of a condensate product is provided and includes charging to a reaction vessel to form a reaction mixture of a triazine monomer, about 3 to about 30 moles of a phenol monomer for each mole of triazine, an acid catalyst having a pKa from 6 to about 11, and from about 1 to about 6 moles of an aldehyde monomer for each mole of triazine monomer, heating the reaction mixture at a temperature from about 165° C. to about 180° C., removing the phenol monomer and any water from the reaction mixture, and steam sparging the reaction mixture.

In another aspect, a method for the preparation of condensate product is provided and includes charging to a reaction vessel to form a reaction mixture of an aldehyde modified triazine monomer and about 3 to about 30 moles of a phenol monomer for each mole of aldehyde modified triazine monomer and heating the reaction mixture to a temperature of about 130° C. to about 180° C. and substantially completing reaction of phenol monomer in the reaction mixture.

DETAILED DESCRIPTION OF THE INVENTION

Embodiments of the invention are directed to condensates, methods for making the condensates, and application of the condensates in epoxy resins, prepregs of porous substrates, and laminates.

In one aspect, the present invention provides for a triazine-arylhydroxy-aldehyde condensate, such as a triazine-phenol-aldehyde (T-P-A or TPA) condensate and processes for the preparation of the triazine-arylhydroxy-aldehyde condensate. The triazine-arylhydroxy-aldehyde condensate may be formed from a reaction mixture of a triazine monomer, an arylhydroxy monomer, and an aldehyde monomer, and an acid catalyst having a pKa of greater than 3.8.

Through the choice of acid catalysts with a pKa value of greater than 3.8, the triazine-arylhydroxy-aldehyde condensates exhibit a viscosity range of 3000 cps or less at 175° C., such as from about 200 cps to about 2000 cps, and contain from about 8 wt. % to about 28 wt. % nitrogen content, for example, from greater than about 10 wt. % to about 24 wt. % nitrogen content. The triazine-arylhydroxy-aldehyde condensates described herein may be substantially free of water as further described herein and may have about 2 wt. % or less of free arylhydroxy monomer.

Additionally, it was surprisingly and unexpectedly discovered that the triazine-arylhydroxy-aldehyde condensates formed by the components and processes described herein have improved solubility over those in the prior art. The triazine-arylhydroxy-aldehyde condensates described herein were observed to stay dissolved in an organic solvent at up to 80 wt. % solids (or higher) for at least 120 hours (5 days) before cloudiness set in, or precipitation, in the form of a white circle at the bottom of the vial, began.

In particular, the triazine-arylhydroxy-aldehyde condensates described herein were observed to provide an improved solubility by dissolving completely in one or more organic solvents having one or more functionalities selected from the group of an ether functionality, a ketone functionality, an alcohol functionality, an ester functionality, and combinations thereof, of which a ketone functionality solvent, such as methyl ethyl ketone (MEK) may be used. The condensates formed as described herein were observed to have a solubility from less than 10 wt. % solids up to 80 wt. % solids, such as from about 33 wt. % solids to about 75 wt. % solids, to give a transparent solution (no turbidity) for 120 hours or greater. Other condensates formed by the processes described herein were observed to have a solubility up to 80 wt. % solids (and sometimes greater) for at least 500 hours.

In comparison, most of the condensates from prior art processes typically dissolve only up to 40 wt. % (solids) and in selected cases roughly about 60 wt. % in common solvents such as MEK.

The processes for forming the condensates as described herein also allow for the production of the condensates in large reaction vessels with improved control over melt viscosity than the prior methods to produce similar condensates.

In one aspect, the triazine-arylhydroxy-aldehyde condensate is formed from a reaction mixture of a triazine monomer, an arylhydroxy monomer, and an aldehyde monomer, and an acid catalyst having a pKa of greater than 3.8, which are described as follows. In one embodiment, the triazine monomer may include an aldehyde functional group, such as an aldehyde modified triazine monomer. The aldehyde modified triazine monomer may be used in place of a separate triazine monomer and a separate aldehyde monomer to form the condensate.

The Triazine Monomer

The triazine monomer may be a triazine compound or a triazine derivative. An example of a triazine compound is melamine and an example of a triazine derivative is a melamine derivative. The triazine derivative may also be an aldehyde modified triazine monomer, such as hexamethoxymethylmelamine (HMMM) or hexamethylolmelamine. The aldehyde modified triazine monomer may provide for the aldehyde presence in the triazine-arylhydroxy-aldehyde condensate and remove the need for a separate aldehyde monomer.

One embodiment of the triazine monomer may be represented by the following formula:

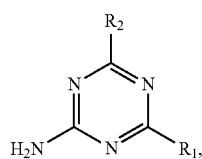

(I)

wherein $R_1$ and $R_2$ may each be independently a hydrogen atom or a functional group selected from the group of an amino group (—$NH_2$), an alkyl group having 1 to 4 carbon atoms, a phenyl group, a vinyl group (—CH=$CH_2$), or a group containing a combination of the functional groups.

Suitable compounds that may be used as the triazine monomer include compounds selected from the group of aminotriazine, 4-methyl-1,3,5-triazine-2-amine, 2-amino-4,6-dimethyl-1,3,5-triazine, melamine, hexamethoxymethylmelamine, hexamethylolmelamine, guanamine, acetoguanamine, propioguanamine, butyroguanamine, benzoguanamine, vinylguanamine, 6-(hydroxyphenyl)-2,4-diamino-1,3,5-triazine, and combinations thereof.

The triazine monomer may also be a mixture of one or more triazine compounds, such as melamine, and a second amine compound, such as benzoguanamine or acetoguanamine. The quantity of melamine is at least 50% by weight of the mixture and the second amine compound may be from about 0.5% to not more than about 50% by weight of the mixture. In one embodiment, the amount of the second amine compound may be from about 1% to not more than about 25% by weight of the mixture.

The triazine monomer may also be a mixture of melamine and two or more amines, such as benzoguanamine and acetoguanamine, wherein the first of one or more amines is not more than about 35% by weight of the mixture, the second of the one or more amines is not more than 35% by weight of the mixture, and the quantity of melamine is at least 50% by weight of the mixture. In one embodiment, the benzoguanamine and acetoguanamine combined are not more than 25% by weight of the mixture and the melamine is at least 75% by weight of the mixture.

The Arylhydroxy Monomer

The arylhydroxy monomer may be any suitable aromatic monomer, such as a phenol monomer. The quantity of an arylhydroxy monomer in the reaction mixture for forming the condensates as described herein may be from about 3 to about 30 moles, such as from about 9 to about 14 moles, of the arylhydroxy monomer for each mole of triazine monomer. Thus, the molar ratio of arylhydroxy monomer to triazine monomer may be from about 3:1 to about 30:1, such as from about 9:1 to about 14:1. This quantity of arylhydroxy monomer in the reaction mixture, i.e., charged to the reaction vessel, may be greater than the amount which reacts in the formation of the condensate. Free, non-reacted, arylhydroxy monomer, such as phenol, may be distilled out of the reaction mixture after completion of the condensate reaction.

Non-limiting examples of arylhydroxy monomers include phenol (phenolic) monomer type compounds. A phenol monomer type compound includes compounds having one or more aromatic hydroxyl groups per molecule, including, for example, mononuclear or binuclear, monohydroxyphenols or dihydroxyphenols (diphenolics, benzene diols). Phenol monomer type compounds having at least one ortho or para position available for bonding are preferred compounds. The phenol monomer type compounds may be an unsubstituted or substituted compound, for example, with an alkyl group, a phenyl group, a hydroxybenzene group, an alkoxy group, and combinations and subsets thereof. The phenol monomer type compound may also include compounds having up to about 15 carbon atoms such as up to about 8 carbon atoms.

Suitable phenol monomers include compounds selected from the groups of cresols, xylenols, bis-phenols, alkylated bisphenols, alkoxyphenols, dihydroxy benzene (diphenolics, benzene diols), naphthols, biphenols, alkylated biphenols, trisphenols, and combinations thereof.

Examples of suitable phenol monomers may include compounds represented by the following formula:

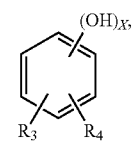

(II)

and X is an integer of 1 or 2, $R_3$ and $R_4$ are each independently a functional group selected from the group of a hydrogen atom, an alkyl group having 1 to 4 carbon atoms, an alkyl group having 1 to 4 carbon atoms with at least one carbon atom being substituted with a hydroxybenzene group, an alkoxy group having 1 to 4 carbon atoms, a phenyl group, a hydroxybenzene group, and combinations and subsets thereof. The $R_3$ and $R_4$ functional groups may jointly form a common aromatic ring with or without a hydroxyl group.

Specific examples of suitable compounds that may be used as the phenol monomer include compounds selected from the group of phenol, para-phenylphenol, 3-ethylphenol, 3-isopropylphenol, 3-methylphenol, 4-methylphenol, 2,6-dimethylphenol, 2,4-dimethylphenol, 2-methoxyphenol, 3-methoxyphenol, bisphenol-A, resorcinol, catechol, alpha-naphthol, and combinations thereof, of which phenol is preferred.

Mixtures of arylhydroxy monomers may also be used. For example, a mixture of at least 90% by weight of phenol and 10% or less by weight of an alkyl phenol, an alkoxy phenol, a dihydroxy phenol, a substituted dihydroxy phenol, and combinations and subsets thereof, may also be used as the phenol monomer.

The Aldehyde Monomer

The term "aldehyde monomer" herein includes compounds having one or more aldehyde functional groups (—CHO) and any compounds yielding aldehydes. The aldehyde monomer may be represented by the formula R—CHO, and R may be an aliphatic or aromatic organic functional group. The aldehyde monomer may be a dialdehyde such as glyoxal. Suitable aldehydes include compounds selected from the group of formaldehyde, acetaldehyde, i-butyraldehyde (isobutyraldehyde), benzaldehyde, acrolein, crotonaldehyde, salicylaldehyde, 4-hydroxybenzaldehyde, furaldehyde, pyrrolaldehyde, cinnamaldehyde, terephthaldialdehyde, glyoxal, and combinations thereof. Compounds yielding aldehydes include compounds selected from the group of paraformaldehyde, trioxymethylene, paraldehyde, and combinations thereof.

The quantity of aldehyde monomer used in manufacture of the condensate as described herein varies from about 1 mole to about 6 moles, such as from about 2 to about 3.5 moles, for each mole of the triazine monomer charged to the reaction vessel. Thus, the molar ratio of aldehyde monomer or aldehyde functional groups to triazine monomer may be from 1:1 to 6:1, such as from 2:1 to 7:2. The quantity of aldehyde may be provided to a reaction mixture in one or more separate additions.

In one embodiment of the aldehyde monomer, the monomer may be a mixture of formaldehyde and one or more aldehydes. Suitable aldehydes for the mixture may include acetaldehyde, i-butyraldehyde (isobutyraldehyde), benzaldehyde, acrolein, crotonaldehyde, and combinations thereof. The one or more aldehydes comprise from about 0.1 mole % to about 20 mole %, such as from about 1 mole % to about 10 mole % of the mixture.

The aldehyde monomer may be introduced neat or as about 20% to about 50% solution in phenol to facilitate metering in the reaction mixture. The aldehyde may be introduced in an aqueous solution of 30 to 45% which may include an organic solvent from 5 to 15%. For example, if formaldehyde is the aldehyde monomer, formaldehyde may be introduced as a 37% aqueous solution with 11% methanol. Formaldehyde may also be generally charged to the reaction mixture as 50 wt. % formalin. Formalin generally contains small quantities of formic acid with about 0.03% of formic acid being typical in a 50% formalin solution.

Further description of arylhydroxy monomers, triazine monomers, and aldehyde monomers are more fully detailed in co-owned U.S. Pat. No. 6,605,354, issued on Aug. 12, 2003, entitled "High Nitrogen Containing Triazine-Phenol-Aldehyde Condensate", which is incorporated by reference to the extent not inconsistent with the recited claims and description herein.

The Acid Catalyst

The methods as described herein for manufacture of the triazine-arylhydroxy-aldehyde condensate may utilize an acid catalyst having a pKa acidity value of greater than 3.8. The pKa acidity value, referred to as pKa or pKa value, may be from greater than 3.8 to about 11. In one composition and method for forming the condensate, a low pKa acidity value catalyst may be used having a pKa value from greater than 3.8 to 6, such as from about 4 to about 5, for example, from about 4.1 to about 4.8. In another composition and method for forming the condensate, a high pKa acidity value catalyst may be used having a pKa value from greater than 6 to about 11, for example, from about 8 to about 10.

Suitable catalysts having the desired pKa acidity values, such as from greater than 3.8 to 6, may be organic acids. Suitable organic acids include monocarboxylic acids, dicarboxylic acids, and combinations thereof. Examples of suitable monocarboxylic acids include, for example, acetic acid, acid, ascorbic acid, benzoic acid, cinnamic acid, adipamic acid, o- and p-aminobenzoic acid, anisic acid, anisylpropionic acid, barbituric acid, butyric acid, isobutyric acid, caproic acid, isocapropic acid, chlorobutyric acid, chlorocinnamic acid, chlorophenylacetic acid, (chlorophenyl) propionic acid, trans-cinnamic acid, trans-crotonic acid, dihydroxybenzoic acid (3,4 and 3,5), ethylbenzoic acid, ethylphenylacetic acid, trans-fumaric acid, gallic acid, glutaramic acid, heptanoic acid, hexahydrobenzoic acid, hexanoic acid, m-hydroxybenzoic acid, p-hydroxybenzoic acid, hydroxybutyric acid, mesitylenic acid, naphthoic acid, o-nitrophenylacetic acid, nonanic acid, octanoic acid, phenylacetic acid, propionic acid, iso-propylbenzoic acid, pyridinecarboxylic acid, suberic acid, toluic acid (meta and para), trimethylacetic acid, valeric acid, vinylacetic acid, and combinations thereof.

Suitable dicarboxylic acids include, for example, acids selected from the group of adipic acid, succinic acid, glutaric acid, methylsuccinic acid, and combinations thereof.

Suitable acid catalysts having the pKa value of greater than 6, for example, include compounds selected from the group of phenol, cresols, vanilla, acetylacetone, glycine, cysteine, 2,3-dichlorophenol, hydroquinone, chlorophenols, naphthols, nitrophenols, tryptophan, tyrosine, xanthine, and combinations thereof. In one embodiment of the acid catalyst having pKa values of greater than 6, the acid catalyst may be the phenol monomer as described herein.

The acid catalyst may be present from greater than 0.1% to less than 1%, such as from about 0.2% to about 0.4% based on the weight of the arylhydroxy monomer (phenol monomer) in the reaction mixture. If the acid catalyst comprises the phenol monomer, no additional acid catalyst amount may need to be added to the reaction mixture.

When the phenol monomer is used as both the acid catalyst and as the phenol monomer, the reaction to form the condensate may be considered self-catalyzing, and under such circumstances a separate acid and/or base catalyst is not needed.

Optionally, additional compounds may be used with the reaction mixture and/or the epoxy resin. One additional compound is a stabilizer that may be a non-reactive diluent that can reduce the viscosity of the condensate or resin. The stabilizer may be an organic compound, and may be cyclical, acyclical, aliphatic, or aromatic in form. Suitable stabilizers may include, and are not limited to, the following classes of compounds: esters, hydroxyaryl moieties, dihydroxyaryl moieties, amides, alcohols, ketones, and combinations and subsets thereof. Examples of suitable stabilizer groups include alkylphenols, glycols, glycol ethers, and combinations and subsets thereof. Examples of stabilizers include compounds selected from the group of cresol, N-methyl pyrrolidone, phenol, hydroquinone, triethylcitrate, butyrolactone, glycerol, ethylene glycol, and combinations thereof. The stabilizer may be added to the reaction mixture from 0.1 wt. % to 2 wt. % of the reaction mixture, such as the triazine-phenol-aldehyde condensate. The stabilizer is preferably added when a solid of the condensate is to be formed and maintained. If a liquid solution of the condensate is to be performed, preferably a solvent is added to the condensate.

Optionally, a base catalyst may be introduced with the acid catalyst described herein. The quantity of base catalyst, also referred to as a catalytically effective quantity of amine catalyst, will typically vary from about 0.01% to about 1% based on the weight of the arylhydroxy monomer charged and preferably from about 0.08% to about 0.3%, for example, from about 0.1% to about 0.2%. The base catalyst may have a pK basicity, or pKb from about 7 to about 11.5.

The base catalyst may be an aliphatic, a cycloaliphatic, and/or a heterocyclic amine having a pK basicity (pKb) of 10 or more, and may further be a secondary or tertiary amine. A tertiary amine may have the formula $R_3N$, with each R may be an alkyl functional group having one to seven carbon atoms, and the nitrogen atom may be part of a heterocyclic ring. In this regard, each of the alkyl groups may be the same or different. A secondary amine having a pKb of 10 or more may have the formula $R_1R_2NH$, with each R may be an alkyl functional group of 2 to 4 carbon atoms. Examples of amines for use as the base catalyst include triethylamine, tributylamine, N-ethyl piperidine, 2-di(n-butylamino)ethanol, 2-di(isopropylamino) ethanol, N-methylpyrrolidine, N,N-dimethyl cyclohexylamine, diethylamine, di-n-butylamine, diisopropylamine, piperidine, pyrrolidine, and combination thereof.

Examples of amines having a pK basicity of less than 10 include, and are not limited to, N-methylmorpholine, N-methyl diethanolamine, triethanolamine, N,N'-dimethylpiperazine, 4-methylpyridine, 2,4-dimethylpyridine, N,N-diethylaniline, and N,N-dimethylbenzylamine, and combinations thereof, may be used as the base catalyst.

The Triazine-Arylhydroxy-Aldehyde Condensate

In one embodiment, the triazine-arylhydroxy-aldehyde condensate may be represented by the following formula:

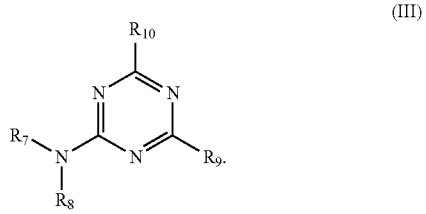

(III)

The $R_7$ and $R_8$ functional groups of the formula (III) may each independently be a hydrogen atom or a functional group having formula (IV):

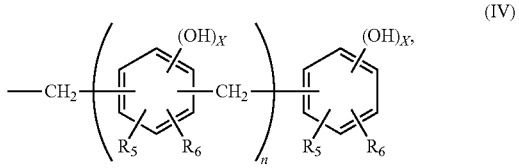

(IV)

where n may be an integer of 0 to 20 and X is an integer of 1 or 2. The $R_5$ and $R_6$ functional groups may be independently a hydrogen atom or a functional group selected from the group of an alkyl group having 1 to 4 carbon atoms, an alkyl group having 1 to 4 carbon atoms with at least one carbon atom being substituted with a hydroxybenzene group, an alkoxy group having 1 to 4 carbon atoms, a phenyl group, a hydroxybenzene, and combinations and subsets thereof. The $R_5$ and $R_6$ functional groups may jointly form a common aromatic ring with or without a hydroxyl group.

The $R_7$ and $R_8$ functional groups may also jointly form a benzoxazine functional group represented by the formula:

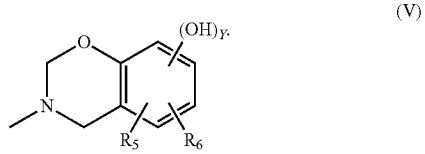

(V)

In Formula (V), the $R_5$ and $R_6$ functional groups are described above with regard to formula (IV), and Y is an integer of 0 or 1. The benzoxazine functional group may be formed during the high pKa process as described herein when the triazine monomer and aldehyde monomer comprise an aldehyde modified triazine monomer such as HMMM. Also, the benzoxazine functional group may be formed when the para position of the phenol monomer is not available for reacting with the aldehyde as in a para substituted phenol monomer such as para-cresol. If the $R_8$ functional group is not part of formula (V), the $R_8$ functional group may be a hydrogen atom or a functional group having the formula (IV).

If the $R_7$ and $R_8$ functional groups of the formula (III) are both hydrogen atoms, then between the $R_9$ and $R_{10}$ functional groups of the formula (III), at least one of the $R_9$ and $R_{10}$ functional groups may be a functional group having the formula (V) or may be a functional group selected from the group of $-NHR_{11}$, $-N(R_{11})_2$, and combinations thereof. The $R_{11}$ functional group may be a hydrogen atom or have the formula (IV).

The $R_9$ and $R_{10}$ functional groups may be each independently be a hydrogen atom or a functional group selected from the group of $-NH_2$, $-NHR_{11}$, $-NHR_{12}$, $-N(R_{11}R_{12})$, $-N(R_{11})_2$, $-N(R_{12})_2$, an alkyl group having 1 to 4 carbons, a phenyl group, a vinyl group ($-CH=CH_2$), a functional group having the formula:

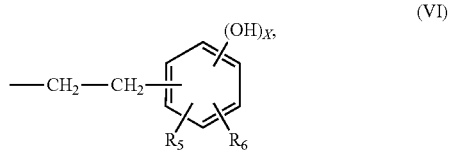

(VI)

a benzoxazine functional group of formula (V), and combinations thereof and subsets thereof. $R_{11}$ and $R_{12}$ may each independently be a hydrogen atom or a functional group having the formula (IV).

One example of an embodiment of the condensate formed by the processes described herein may be represented by the following formula:

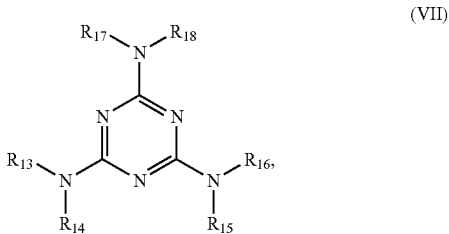

(VII)

where the $R_{13}$ functional group may have the formula (IV) given above or may jointly form with the $R_{14}$ functional group a benzoxazine functional group having the formula (V) given above. If the $R_{14}$ functional group is not part of formula (V), the $R_{14}$ functional group may be a hydrogen atom or a functional group having the formula (IV). The $R_{15}$ and $R_{16}$ functional groups may each independently be a hydrogen atom or a functional group having the formula (IV). The $R_{15}$ and $R_{16}$ functional groups may also jointly form a benzoxazine functional group having formula (V). $R_{17}$ and $R_{18}$ may each independently be a hydrogen atom or a functional group having the formula (IV). Similarly, the $R_{17}$ and $R_{18}$ may also jointly form a benzoxazine functional group having formula (V).

The condensate in formula (VII) may be obtained by reacting either melamine with phenol monomer and formaldehyde monomer or a melamine derivative, such as HMMM, with a phenol monomer. It is to be noted that if an aldehyde other than formaldehyde is utilized in these reactions, the $CH_2$ group that is given in the formulas (IV), (V) and (VI) will be replaced with —CH(R) where the R group originates from the R group of the aldehyde represented by the formula R—CHO. The R could be an aliphatic or aromatic group depending on whether the aldehyde is aliphatic or aromatic. For example, R is a methyl group when the aldehyde is acetaldehyde and R is a phenyl group when the aldehyde is benzaldehyde. The most preferred aldehyde is formaldehyde.

Additionally, condensates may be prepared with low arylhydroxy content and substantially free of water. After the removal of the non-reacted (free) arylhydroxy monomer, such as phenol, from the reaction mixture in the processes described herein, the free arylhydroxy monomer content of the triazine-arylhydroxy-aldehyde condensate may be less than about 2 wt. %, such as less than about 0.75% by weight of the condensate. The triazine-arylhydroxy-aldehyde condensate formation processes described herein have substantially all of the free water removed, for example, less than about 1 wt. % and preferably less than 0.5 wt. % of water remains in the condensates.

The triazine-arylhydroxy-aldehyde condensates, as described herein and further shown in the examples herein, may have a solubility of up to at least 60% by weight and preferably greater than 80% by weight of the condensate in one or more organic solvents having one or more functionalities selected from the group of an ether functionality, a ketone functionality, an alcohol functionality, an ester functionality, and combinations thereof, for at least 120 hours, such as for at least 500 hours. For example, the condensate solutions prepared at 33 wt. % solids or higher may remain in dissolved state without getting cloudy or precipitating in the form of a white circle at the bottom of the vial for at least 120 hours and in many instances for an indefinite period of time.

The one or more organic solvents may each respectively have one or more functionalities selected from the group of an ether functionality, a ketone functionality, an alcohol functionality, an ester functionality, and combinations thereof, of which a ketone functionality solvent, such as methyl ethyl ketone (MEK) may be used. Suitable solvents may be selected from a group of a ketone solvent, an alcohol solvent, an ether solvent, a glycol ether solvent, an ester solvent, a glycol ester solvent, and combinations thereof. Each of the molecules of the solvents described herein may have from 1 to 12 total carbon atoms, such as from 3 to 10 carbon atoms. Examples of suitable solvents may include a compound selected from the group of methyl ethyl ketone (MEK), methyl isobutyl ketone (MIBK), acetone, methanol, isopropyl alcohol, 1 methoxy-2-propanol, and combinations thereof.

The triazine-arylhydroxy-aldehyde condensates as described herein may contain up to about 28 wt. % of nitrogen, such as from about 8 wt. % to about 28 wt. % of nitrogen, for example, from about 8 wt. % to about 25 wt. %. In one embodiment, the triazine-arylhydroxy-aldehyde condensates as described herein may contain from greater than about 10 wt. % to about 24 wt. % of nitrogen based on the weight of the condensate.

The triazine-arylhydroxy-aldehyde condensates described herein may have a viscosity below 3,000 cps and even less than 1,700 cps, such as from about 200 cps to about 1200 cps, at 175° C. The process for forming the triazine-arylhydroxy-aldehyde condensates was also observed to have provided for an improved viscosity control over prior resins. The improved viscosity control was achieved by controlling the increase in the viscosity of the resin to 20% or less, such as less than 10%, during and subsequent to arylhydroxy removal until the condensate is finished as a solid by heating at temperatures up to 165° C. during the final stages of production process in large reactors. As such, triazine-arylhydroxy-aldehyde condensates, such as melamine-phenol-formaldehyde condensates, formed with the components described herein, exhibit a reduced increase of viscosity when held at process temperatures at 165° C. instead of 175° C.

In contrast, it is believed that prior art TPA condensates undergo molecular rearrangements that result in a viscosity increase and a reduced solubility in common solvents when held (greater than 1 hour) at an elevated temperature, such as 175° C. or greater, over time as a result of resin degradation in the phenol removal step of the process.

Also, it has been observed that the triazine-arylhydroxy-aldehyde condensates obtained by the high pKa processes described herein (pKa of greater than 6) unexpectedly and surprisingly exhibited increased reactivity, including self-curing reactivity and exothermic heat generation, than condensates made with added catalysts that have a pKa value of less than 5.

For example, a DSC (differential scanning calorimeter) analysis of a condensate formed from a HMMM-phenol reaction mixture described herein, such as in Example 9A, was observed to have an exothermic reaction at around 183° C. This exothermic reaction indicates a self-curing reaction that was not observed in prior art processes or the low pKa process of the current invention.

Further examples of self-curing reactions were observed in Examples 9A and 3. The condensate from the HMMM-phenol reaction mixture, when heated at 175° C. for only about 4 hours in Example 9A, was observed to have a self-curing type reaction which is evidenced by hardening of the resin. The condensate made from melamine, phenol and formaldehyde reaction mixture in Example 3, was observed to undergo a viscosity increase of greater than 100% when heated at 175° C. for 7 hours.

As the triazine-arylhydroxy-aldehyde condensates form such processes described herein have been observed to exhibit self-curing like behavior when heated at temperatures of above 165° C., under such conditions the condensate may be designated as a self-curing reaction and/or a self-curing condensate.

In view of such reactivity, the triazine-arylhydroxy-aldehyde condensates made from the high pKa processes described herein may be prepared as a solution of the triazine-arylhydroxy-aldehyde condensates in one or more organic solvents having one or more functionalities selected from the group of an ether functionality, a ketone functionality, an alcohol functionality, an ester functionality, and combinations thereof, or formed as a solid with a viscosity stabilizer, to preserve a desired viscosity and reduce the reactivity of the condensate.

It has also been observed that the condensates formed by the processes described herein exhibited improved color stability over time. The condensates exhibited a Gardner color scale number of less than 3, and maintained a Gardner color scale number of less than 3, such as less than 1, for at least 150 days. Additionally, the surprisingly and unexpectedly improved color stability was also observed by the condensates having a color change on the Gardner color scale number of less than 0.5, such as less than 0.2, for at least 150 days. Alternatively, the improved color stability was also observed by the condensates having a color change on the Hazen Color scale value (also referred as APHA) of less than 20, such as less than 8, for at least 150 days.

The Gardner color scale numbers and Hazen Color scale values were observed for pilot plant batch results of Entry Numbers 1 and 2 (as shown in Tables II and III herein) formed using the process in Example 2. For Entry Number 1, the initial Gardner color scale number was observed to be 0.7 and the initial Hazen Color scale value was observed to be 153, and when measured 154 days later, the Gardner color scale number was observed to be 0.8 and the Hazen Color scale value was observed to be 156. For Entry Number 2, the initial Gardner color scale number was observed to be 0.53 and the initial Hazen Color scale value was observed to be 125, and when measured 154 days later, the Gardner color scale number was observed to be 0.6 and the Hazen Color scale value was observed to be 132.

The color scale values of the condensates measured above were analyzed by dissolving the respective condensates in reagent grade acetone to prepare a 30% solids solution (1 g resin, 2.33 g acetone or 0.75 g in 1.75 g acetone), which was then mixed and dissolved completely at ambient temperature and filtered using 0.45 micron syringe filter before being measured for respective colors using a LICO® 100 LCM Plus colorimeter from Dr. Lange GmbH & Co. KG, of Germany. The LICO® 100 LCM Plus colorimeter can measure up to five different color values including Gardner Color values and Hazen Color values (also referred as APHA). The colorimeter measures the Gardner color value scale having a range from 0 to 18 with an accuracy of about +/−0.1. The colorimeter measures the Hazen (APHA) color value scale having a range from 0 to 1000 with an accuracy of about +/−2. At least three readings were recorded for each color scale and the results were averaged. While the average variation in APHA color value between measurements was about 27, the variation in Gardner was about 0.1.

Additionally, it has been observed that the resins obtained by a high pKa process described herein (pKa of greater than 6) were unexpectedly and surprisingly observed to have higher $T_d$ (temperature at which 5% weight loss occurs) and yield significantly higher glass transition temperatures upon curing with epoxies than the triazine-phenol-aldehyde condensates made by prior art processes. The $T_d$ of these resins were found to be greater than 300° C., which is at least 15° C. higher than the resins made by the low pKa process. Also, these resins, when cured with an epoxy cresol novolac, yielded unexpectedly high $T_g$ of 189° C. to 197° C.

The triazine-arylhydroxy-aldehyde condensate as described herein may be further reacted with additional formaldehyde, for example, 5 to 15%, based on the weight of the initial amount of formaldehyde in order to raise the glass transition temperature of cured compositions of the triazine monomers, phenol monomers, and aldehyde monomers condensate and an epoxy resin.

Methods for Forming Triazine-Arylhydroxy-Aldehyde Condensates

Embodiments of the condensates of the triazine monomers, arylhydroxy monomers, and aldehyde monomers, may be prepared by the process embodiments as follows. While the following processes are described as using a phenol monomer as the arylhydroxy monomer, the invention contemplates that arylhydroxy monomers other than phenol may be used in the processes described below, and the following description should not be construed or interpreted as limiting the scope of the invention.

In all of the methods, the molar ratio of the reactants may be from about 3 moles to about 30 moles, such as from about 9 to about 14 moles of a phenol monomer for each mole of a triazine monomer charged to a vessel and from about 1 to about 6 moles, such as from about 2 to about 3.5 moles, of an aldehyde monomer for each mole of triazine charged to a vessel.

The various reaction steps for preparation of the condensates by the processes as described herein may be conducted in the same reaction vessel. A non-reactive atmosphere, such as nitrogen gas or a noble gas, is optionally employed to minimize oxidation of aldehyde and discoloration of product. In the order of charging ingredients to the reaction vessel, the aldehyde is typically added after the triazine, phenol and catalyst except in the high pKa acid catalyst method when the high pKa catalyst may be added with or after the other components. In each of the methods for the manufacture of the condensates, when aldehydes other than formaldehyde are used, such other aldehydes are typically reacted at a temperature of about 100° C. or less prior to the addition of formaldehyde.

The Low pKa Value Acid Catalyst Method

In the processes described herein for making the condensate for the low pKa value acid catalyst method, the pH of the mixture of arylhydroxy monomer and acid catalyst may be from about 2 to about 4.

In one embodiment of the low pKa acid catalyst method, the initial reaction mixture includes an acid catalyst having a pKa acidity of from greater than about 3.8 to 6, such as a pKa acidity from about 4.1 to about 4.8. The quantity of acid varies and is generally from about 0.1% to 1% by weight (wt. %), such as from about 0.1 wt. % to 0.5 wt. %, for example, from about 0.2 wt. % to 0.4 wt. %, based on the quantity of arylhydroxy monomer charged. Suitable acid catalysts that may be used in the low pKa acid catalyst method include the acid mentioned herein, and preferably include an acid selected from the group of acetic acid, adipic acid, ascorbic acid, benzoic acid, cinnamic acid, succinic acid, and combinations thereof, among others.

One embodiment of the process to form a condensate from triazine monomers, arylhydroxy monomers, and aldehyde monomers includes charging the triazine monomer to a reaction vessel, charging from about 3 to about 30 moles, such as about 9 to about 14 moles of an arylhydroxy monomer for each mole of triazine monomer with about 0.1 wt. % to 0.5 wt. % of the acid catalyst described herein relative to the weight of the arylhydroxy monomer. The acid catalyst may have a pKa of about 3.8 to 6, such as a pKa acidity from about 4.1 to about 4.8. In one example, the triazine monomer is triazine, the arylhydroxy monomer is phenol, the aldehyde monomer is formaldehyde, and benzoic acid is the acid catalyst.

The reaction mixture is then heated at a temperature of about 70° C. to 110° C. and then about 50% to 63% of the total from about 1 mole to 6 moles, such as from about moles 2.2 to 3.2 moles (i.e., from about 1.1 to about 2.0 moles for the from about moles 2.2 to 3.2 moles), of aldehyde monomer for each mole of triazine monomer may be then charged to the reaction vessel in one or more additions at this temperature. Alternatively, the entire aldehyde monomer or the aldehyde modified triazine compound, such as in HMMM described above, may be charged to the reaction vessel on one addition process. The reaction mixture is then heated to a temperature of about 120° C. to about 140° C. to effect copolymerization of the three monomers and to remove water and the temperature is maintained for about 1 to about 2 hours.

The reaction mixture is then cooled to a temperature which does not exceed about 110° C., such as that of about 70° C. to about 110° C., and the remainder of the aldehyde monomer is added. The reaction mixture is then heated to a temperature above 120° C. to continue copolymerization and remove water and the temperature is maintained for about 1 to about 2 hours until the reaction of the arylhydroxy monomer is substantially complete.

The reaction mixture may then be heated to a temperature of about 145° C. to about 165° C. to continue removing water from the reaction mixture. The reaction mixture is then distilled under full vacuum to remove most of the non-reacted arylhydroxy monomer. Optionally, the reaction mixture may then be further heated to further remove additional amounts of the arylhydroxy monomer from the condensate, for example, to a temperature not exceeding 180° C. for phenol removal, when steam sparging is adopted to remove trace amounts of the arylhydroxy monomer from the condensate.

The recovered condensates were observed to have a range of viscosity from about 200 cps to about less than 3000 cps, for example as from about 1100 cps to about 1700 cps, and contain from about 8 wt. % to about 28 wt. % nitrogen content, for example, from greater than 10 wt. % to about 23 wt. % nitrogen content. The recovered condensates exhibited a solubility in one or more organic solvents having one or more functionalities selected from the group of an ether functionality, a ketone functionality, an alcohol functionality, an ester functionality, and combinations thereof, of which methyl ethyl ketone (MEK) is preferably used, up to 80 wt. % solids (or higher), such as from about 33 wt. % solids to about 75 wt. % solids to give a transparent solution (no turbidity) that stayed dissolved for an indefinite period of time, such as greater than or equal to 120 hours. For example, the recovered condensates in the MEK solutions from about 33 wt. % solids to 80 wt. % and higher stayed dissolved for an indefinite period of time, such as greater than 500 hours.

Alternatively, subsequent to arylhydroxy monomer removal by vacuum distillation and/or steam sparging, the condensate is cooled to temperatures less than 165° C. and tested for melt viscosity. If the viscosity is higher than the desired value, such as about 1400 cps, a small amount of an additive also referred to as a stabilizer (or diluent), of about 0.1 to about 2% relative to the weight of the condensate may be added. The addition of stabilizer helps control the viscosity of the resin from increasing significantly when held at elevated temperatures for longer duration during the solidification (flaking) process depending on the size of the batch.

A further aspect for the low pKa acid method is to produce the solid product described by any of the low pKa processes described herein, and add a stabilizer or alternatively, to further dissolve the product in one or more organic solvents having one or more functionalities selected from the group of an ether functionality, a ketone functionality, an alcohol functionality, an ester functionality, and combinations thereof, of which methyl ethyl ketone (MEK) is preferably used, and finish as a composition preferably of from about 30 wt. % to about 60 wt. % solids.

The High pKa Acid Catalyst Method

In the processes described herein for making the condensate for the high pKa value acid catalyst method, the pH of the mixture of arylhydroxy monomer and acid catalyst may be from about 4 to about 6.

In one embodiment of the high pKa acid catalyst method, the initial reaction mixture includes an acid catalyst having a pKa acidity of from greater than 6, such as a pKa acidity value from greater than 6 to about 11, and the quantity of acid catalyst varies from about 0.1% to about 1% by weight, such as from about 0.2 wt. % to about 0.4 wt. %, for example, from about 0.2 wt. % to about 0.4 wt. % based on the quantity of arylhydroxy monomer charged. Alternatively, if the acid catalyst is phenol or other arylhydroxy corresponding to the arylhydroxy monomer, no additional acidic catalyst may need to be added, and the reaction can be considered as self-catalyzing.

Suitable acid catalysts that may be used in the high pKa acid catalyst method include phenol, cresols, vanilla, acetylacetone, glycine, cysteine, 2,3-dichlorophenol, hydroquinone, chlorophenols, naphthols, nitrophenols, tryptophan, tyrosine, xanthine, and combinations thereof, among others.

One embodiment of the process to form a condensate from triazine monomers, arylhydroxy monomer, and aldehyde monomers includes charging the triazine monomer to a reaction vessel, charging from about 3 to about 30 moles, such as from about 9 to about 14 moles, of an arylhydroxy monomer for each mole of triazine monomer with about 0.1 wt. % to about 0.5 wt. % of the acid catalyst described herein relative to the weight of the arylhydroxy monomer. The acid catalyst may have a pKa of 6 to about 11, such as a pKa acidity from about 9 to about 10. In one example, the triazine monomer is melamine, the arylhydroxy monomer is phenol, the aldehyde monomer is formaldehyde, and phenol itself with a pKa of about 10 performs as the acid catalyst.

The reaction mixture is then heated at a temperature of about 70° C. to 110° C. about 50% to 63% of the total from about 1 mole to 6 moles, such as from about 2.2 moles to 3.2 moles (i.e., from about 1.1 to about 2.0 moles of the about moles 2.2 to 3.2 moles), of aldehyde monomer for each mole of triazine monomer is then charged to the reaction vessel at this temperature. Alternatively, the entire aldehyde monomer or compound containing the aldehyde component, such as in HMMM described above may be charged to the reaction vessel. The reaction mixture is then heated to a temperature of about 130° C. to about 160° C. to effect copolymerization of the three monomers and to remove water and the temperature is maintained for about 1 to 2 hours.

The reaction mixture is then cooled to a temperature of about 110° C. or less, such as that of about 80° C. to 110° C., and any remainder of the aldehyde monomer is added. The reaction mixture is then heated to a temperature above 120° C. to continue copolymerization and remove water and the temperature is maintained for about 1 to about 2 hours until the reaction of the arylhydroxy monomer is substantially complete.

The reaction mixture is then heated to a temperature of about 145° C. to about 165° C. to continue removing water from the reaction mixture. The reaction mixture is then distilled under full vacuum to remove most of the non-reacted arylhydroxy monomer. Optionally, the reaction mixture may then be further heated to further remove additional amounts of the arylhydroxy monomer from the condensate, for example, to a temperature not exceeding 180° C. for phenol removal, when steam sparging is adopted to remove trace amounts of the arylhydroxy monomer from the condensate.

The recovered condensates were observed to have a range of viscosity from about 500 cps to about 3000 cps, for example as from about 1000 cps to about 1800 cps, containing from about 8 wt. % to about 28 wt. % nitrogen content, for example, from greater than about 10 wt. % to about 25 wt. % nitrogen content.

The recovered condensates exhibited a solubility in one or more organic solvents having one or more functionalities selected from the group of an ether functionality, a ketone functionality, an alcohol functionality, an ester functionality, and combinations thereof, of which methyl ethyl ketone (MEK) is preferably used, from less than 10 wt. % solids to 80 wt. % solids (or higher), such as from about 33 wt. % solids to about 75 wt. % solids to give a transparent solution (no turbidity) that stayed dissolved for an indefinite period of time, such as greater than 500 hours. For example, the recovered condensates in the MEK solutions from about 33 wt. % solids to 80 wt. % and higher stayed dissolved for an indefinite period of time, such as greater than 500 hours. Alternatively, the High pKa Acid Method may be as Follows.

A second embodiment of the high pKa acid process to form a condensate from triazine monomers, arylhydroxy monomers, and aldehyde monomers includes charging the triazine monomer to a reaction vessel, charging from about 3 to about 30 moles, such as from about 9 to about 14 moles, of an arylhydroxy monomer for each mole of triazine, to about 1 to about 6 moles, such as from about 2.2 to about 3.2 moles, of an aldehyde monomer for each mole of triazine monomer with an optional amount from about 0.1 wt. % to about 0.5 wt. % of the acid catalyst described herein relative to arylhydroxy monomer weight. The acid catalyst may have a pKa of 6 to about 11. In one example, the triazine monomer is melamine, the arylhydroxy monomer is phenol, the aldehyde monomer is formaldehyde, and the arylhydroxy monomer is the acid catalyst.

The reaction mixture is then gradually heated from about 165° C. to about 180° C. in the distillation mode to remove water and the arylhydroxy monomer. Steam sparging is performed in the manner described earlier to remove last traces of arylhydroxy monomer, and the product is obtained as a solid.

In a further alternative embodiment for the high pKa acid method, the process may be as follows for the reaction of a triazine derivative monomer and arylhydroxy monomer.

A third embodiment of the reaction to form a condensate includes an aldehyde modified triazine monomer (an alkylated methylol triazine) and arylhydroxy monomer being charged to a reaction vessel, charging from about 3 to about 30 moles, such as from about 9 to about 14 moles of an arylhydroxy monomer for each mole of the aldehyde modified triazine monomer with an optional amount from about 0.1 wt. % to about 0.5 wt. % of the acid catalyst described herein relative to the weight of the arylhydroxy monomer. The acid catalyst may have a pKa of greater than 6 to about 11. In one example, the alkylated methylol triazine (for the triazine monomer and aldehyde monomer) is hexamethoxymethylmelamine (HMMM), the arylhydroxy monomer is phenol, and the arylhydroxy monomer is the acid catalyst.

The reaction mixture is then gradually heated to from about 130° C. to about 180° C. in the distillation mode to remove water and the arylhydroxy monomer. Steam sparging may then be performed in the manner described earlier to remove last traces of the arylhydroxy monomer. Then, applying a vacuum gradually until most of non-reacted arylhydroxy monomer is removed at about 180° C. to reduce the arylhydroxy monomer level to <2% in the final product. The process is concluded by discharging the product as a solid from the reaction vessel.

A fourth embodiment for the high pKa acid method is to produce the solid product described by any of the processes described herein for the high pKa acid method, and add a stabilizer or alternatively, to further dissolve the product in one or more organic solvents having one or more functionalities selected from the group of an ether functionality, a ketone functionality, an alcohol functionality, an ester functionality, and combinations thereof, of which methyl ethyl ketone (MEK) is preferably used, and finish the composition preferably as 30 wt. % to 60 wt. % solids.

In both the low pKa acid catalyst method and the high pKa acid catalyst method described herein, after the reaction mixture is substantially free of the initial aldehyde monomer charge, the reaction mixture is heated to a temperature and time sufficient to prevent gelation of the reaction mixture such as on the subsequent addition of the remaining aldehyde monomer. The time and temperature for this can vary. Thus, in the case of the low pKa acid catalyst method, gelation has been prevented by heating in the presence of added acid at a temperature of about 100° C. to 140° C. for about one to four hours. In the case of the high pKa acid catalyst method, gelation has been prevented by heating to a temperature of about 130° C. to 160° C. for about 0.5 to 2.5 hours.

Without wishing to be held to any theory of operation, at the lower temperatures of less than 100° C., it appears that the principal reaction is methylolation of the triazine with the aldehyde. In such low temperature methylolation the arylhydroxy monomer acts principally as a diluent in the reaction mixture and as a solvent for the intermediate methylolated triazine. At higher temperatures, for example, above about 110° C., the methylolated triazine or melamine condensate reacts with the arylhydroxy monomer and phenolation takes place. Again not wishing to be held to any theory of operation, the heating step, in those methods where it is performed after the initial methylolation, appears to cause rearrangement of the intermediate melamine condensate, so as to free up methylene groups to react with the arylhydroxy monomer as well as inhibiting gelation of an intermediate condensate.

Additionally, the processes described herein involving the acid catalysts allow for processing at temperatures not exceeding 180° C. during the arylhydroxy monomer removal process and by cooling the reaction mixture below 170° C., thereby, minimizing the condensate degradation. For example, a resin formed from the condensate held at a temperature of 165° C. for 7 hours exhibited lower viscosity growth and better solubility than the resin held at 175° C.

Since the arylhydroxy monomer (phenol) is charged in excess to the reaction mixture, a substantial quantity of arylhydroxy monomer, such as phenol, will be distilled out of the reaction vessel after the substantially complete reaction of the arylhydroxy monomer with the intermediate condensate and formation of the triazine-arylhydroxy-aldehyde condensate as described herein. The triazine-arylhydroxy-aldehyde condensate may then contain less than about 2% by weight of arylhydroxy monomer. Steam sparging with or without vacuum at such temperatures can also be used to remove arylhydroxy monomer in the product, particularly to achieve free phenol levels of about 2% or less by weight, such as arylhydroxy monomer levels of less than 0.75% by weight.

Any water which has not been distilled is also removed from the reaction mixture so that the product is substantially free of water, for example less than about 1% by weight and preferably less than about 0.5% by weight. Water may be removed from the reaction mixture by distillation. Whatever water is not removed during such distillations, may be removed after completion of the reactions at temperatures of about 145° C. to 165° C. and whatever water remains is removed when the excess arylhydroxy monomer i.e., free or non-reacted phenol, is removed from the reaction mixture by conventional techniques such as that used for removal of arylhydroxy monomer from other novolac resins such as by raising the temperature from about 160° C. to less than about 180° C., such as up to about 175° C., together with increasing the vacuum to about 27 inches or above of mercury.

Epoxy Compositions Derived from Triazine-Arylhydroxy-Aldehyde Condensates

The triazine-arylhydroxy-aldehyde condensates, as described herein, may be curing agents for epoxy resins and as intermediates in epoxy compositions, and also provide fire-retardant properties to epoxy compositions. The compositions of the invention are applicable for use with re-enforcement materials such as glass cloth and fiber, thereby providing composites, for example, laminates, for printed wire boards with superior properties. The compositions as described herein are also suitable in the manufacture of molded products as well as for other uses which employ phenolic novolac resins.

The Epoxy Resin Compositions

The epoxy resin used in the processes and compositions described herein may include one or more epoxy resins. The epoxy resin compositions used in making the flame retardant compositions and laminates as described herein will typically have weight per epoxy equivalent (WPE) values of about 190 to about 10,000 and preferably about 190 to about 500.

Illustrative of the epoxy resins, there may be mentioned those of diglycidyl ether resins, such as those having the above mentioned WPE values, prepared by contacting a dihydroxy compound with an excess of epichlorohydrin in the presence of an alkali metal hydroxide where the dihydroxy compound may be: bisphenol A, brominated bisphenol A, bisphenol F, resorcinol, neopentyl glycol, cyclohexanedimethanol, and combinations thereof. Such resins are also referred to as being based on or derived from the dihydroxy compound involved, for example bisphenol A. Glycidylated triazine-arylhydroxy-aldehyde condensate may be made by known methods, i.e., by reaction of the triazine-arylhydroxy-aldehyde condensate with excess epihalohydrins, such as epichlorohydrin, in the presence of an alkali. Isolation is preferably performed below 100° C. as there may be a tendency to self-crosslink.

Also, such conventional epoxy resin may be that of: epoxy phenol novolacs, epoxy cresol novolacs, particularly glycidyl ethers of an o-cresol/formaldehyde novolacs, aromatic glycidyl amine resins such as triglycidyl-p-amino phenol, N,N,N',N'-tetraglycidyl-4,4'-diaminodiphenyl methane, glycidyl ethers of a phenolic novolac, poly(glycidylated) copolymers of glycidyl methacrylate where the comonomer includes unsaturated compounds such as acrylates, methacrylates and styrene, and mixtures and co-polymers thereof, such as phenol-cresol novolac and phenol-bisphenol A novolac co-polymers, of the various conventional epoxy resins.

Non-glycidylated epoxy resins may also be employed. Examples of such non-glycidylated epoxy resins include: limonene dioxide (weight per epoxy of 85); vinyl cyclohexene dioxide; divinyl benzene dioxide; 5-vinyl-2-norbornene dioxide (weight per epoxy of 76); 1,5-heptadiene dioxide; 1,7-octadiene dioxide. The non-glycidylated epoxy compounds are preferably used in conjunction with glycidylated epoxy resins and are also useful as diluents.

The reaction to form an epoxy resin composition with the condensate described herein may be performed free of a curing accelerator, such as an amine catalyst or a phosphorous containing catalyst. If the epoxy resin composition is formed without the presence of a curing accelerator, the epoxy resin composition may be considered, or designated, as self-curing.

Epoxy curing accelerators may be used in the epoxy compositions in a quantity sufficient to accelerate the cure of the epoxy resin. Generally, such quantity may be from about 0.05 to 0.5 parts based on 100 parts of the base epoxy resin and particularly about 0.1 to 0.2 parts. Curing accelerator, also referred to as catalyst, may include amine catalysts. Such amine catalysts may include, and are not limited to 2-methylimidazole, 2-ethyl-4-methylimidazole, amines such as 2,4,6-tris(dimethylaminomethyl)phenol and benzyldimethylamine, and organophosphorus compounds such as tributylphosphine and triphenylphosphine. A separate curing accelerator may not need to be used to form the epoxy resins/compositions; and the epoxy component and the triazine-arylhydroxy-aldehyde condensate may comprise a self-catalyzing formulation.

Compositions as described herein when used in electronic applications such as laminates for the production of printed circuit boards will typically comprise the following composition based on 100 parts of an epoxy resin: (a) about 0-30 parts of phenolic-formaldehyde novolac; (b) about 30-60 parts of the triazine-arylhydroxy-aldehyde condensates as described herein; and (c) optionally, an epoxy curing accelerator.

The triazine-arylhydroxy-aldehyde condensate may be used as the curing agent alone and/or to impart flame-retardant properties to the epoxy resin. Alternatively, the triazine-arylhydroxy-aldehyde condensate may be used together with one or more conventional epoxy resin curing agents and/or flame-retardant agents.

A variety of curing agents well known in the art may be used together with the triazine-arylhydroxy-aldehyde condensates as described herein in curing the epoxy resin. The curing agents include and are not limited to aromatic amines, polyamidoamines, polyamides; dicyandiamide, phenolic-formaldehyde novolacs, melamine-formaldehyde resins, melamine-phenolic-formaldehyde resins, benzoguanamine-phenolic-formaldehyde resins and combinations thereof. Examples of suitable curing agents of a phenolic-formaldehyde novolac curing agent include compounds selected from the group of phenol novolac, cresol novolac, naphthol novolac, bisphenol A novolac, phenol-glyoxal condensate, and combinations and subsets thereof.

Reactive diluents for the epoxy compositions may also be present in the epoxy compositions to lower viscosity and improve handling characteristics. Examples of reactive diluents include neopentylglycol diglycidyl ether, butanediol diglycidyl ether, resorcinol diglycidyl ether, cyclohexane dimethanol diglycidyl ether, and combinations thereof.

When phenolic novolacs are used as curing agents, a catalyst (accelerator) is generally employed and may be selected from tertiary organic amines such as 2-alkylimidazoles, benzyldimethylamine, and phosphines such as triphenylphosphine, and combinations thereof.

The phenolic novolac curing agents are condensation products of a phenol with an aldehyde or ketone, and the phenolic monomer may be selected from phenol itself, cresols, xylenols, resorcinol, bisphenol-A, paraphenyl phenol, naphthol, and combinations and subsets thereof. Substituents for the phenolic monomers include hydroxy, alkyl of 1 to 4 carbon atoms, alkoxy of 1 to 4 carbon atoms as well as phenyl. Particularly preferred curing agents are the phenol-formaldehyde novolacs, for example, where the phenol is phenol itself, and ortho-cresol-formaldehyde novolacs having a molecular weight of 600 to 5,000 and preferably about 1,000 to 5,000. Illustrative of the aldehydes for preparation of the phenolic novolac curing agents there may be mentioned formaldehyde, acetaldehyde, benzaldehyde and hydroxybenzaldehyde. Illustrative of ketones for preparation of the phenolic novolac curing agents there may be mentioned acetone, hydroxyacetophenone, and methyl ethyl ketone.

A wide variety of solvents may be used in the epoxy compositions as described herein including one or more organic solvents having one or more functionalities selected from the group of an ether functionality, a ketone functionality, an alcohol functionality, an ester functionality, and combinations thereof. Suitable solvents include halogenated solvents, ketone solvents, alcohol solvents, ether solvents including glycol ethers, ester solvents, such as glycol ester solvents including glycol acetates, N,N-dimethylformamide, or combinations thereof, may be used in the epoxy compositions. The latter is particularly useful when dicyandiamide is used as curing agent. Ketones include acetone, methyl ethyl ketone, diethyl ketone, and methyl isobutyl ketone.

Phosphorus containing additives may be used for enhancing the flame retardants properties of the epoxy formulations with the triazine-arylhydroxy-aldehyde condensates described herein. Examples of suitable phosphorus containing additives include elemental red phosphorus, phosphorus and phosphoric acids, triphenyl phosphine, triphenyl phosphine oxide, cyclic and linear phosphazines such as various phenoxyphosphazene compounds, tris(2-hydroxyphenyl)-phosphine oxide, 9,10-dihydro-9-oxa-10(2,5-dioxotetrahydro-3-furanylmethyl)-10-phosphphaphe nanthrene-10-oxide, melamine phosphate, melamine cyanurate, non-halogenated phosphorus compounds in U.S. Pat. No. 3,702,878, U.S. Pat. No. 5,481,017, U.S. Pat. No. 4,086,206, and bis(2,4-di-t-butylphenyl)pentaerythritol diphosphite (Ultranox 626 by GE Specialty Chemicals of Parkersburg, W. Va.) The quantity of the phosphorus containing additive can vary from about one percent to ten percent based on the weight of the triazine monomers, phenol monomers, and aldehyde monomers additive.

Laminates of the Epoxy Resin Compositions

The laminates as described herein are conventional laminates containing a reinforcing agent such as glass cloth, and a cured resinous matrix comprising an epoxy resin and a triazine-arylhydroxy-aldehyde condensate as described herein as a curing agent and flame-retardant alone or together with other curing agents and/or flame retardant agents for the epoxy resin. The laminates may comprise the reinforcing agent together with the cured epoxy compositions mentioned hereinabove.

The structure of the laminates as described herein are the same as those of conventional laminates containing a reinforcing agent such as glass cloth, and a resinous matrix comprising an epoxy resin and a curing agent for the epoxy resin.

The laminates as described herein will generally contain about 40% to 80% by weight of resinous matrix material to about 20% to 60% by weight of reinforcing material such as glass cloth.

Conventional laminating techniques may be used in making the laminates as described herein such as the wet or dry-lay-up techniques. Multiple layers of resin impregnated reinforcing material, upon curing, make up the laminate.

The pressure used in making the laminates can vary from the contact pressure of applying a laminated lining to a tank wall to the high pressure, for example, 1,000 psi or more, used in the manufacture of electrical insulation sheets. The temperature used in making the laminates can vary over a wide range such as that of about room temperature to over 210° C.

The laminate may be prepared at room temperature or by heating under pressure a layer comprising at least one sheet of prepreg comprising an epoxy resin as impregnate. The pressure used in making the laminates can vary from the contact pressure of applying a laminated lining to a tank wall to the high pressure, for example, 1,000 psi or more, used in the manufacture of electrical insulation sheets. The temperature used in making the laminates can vary over a wide range such as that of about room temperature to over 210° C. The use of a solvent in the laminate compositions is optional. Conventional laminating techniques may be used in making the laminates as described herein, for example, such as the wet or dry-lay-up techniques.

Reinforcing fibers or fabrics of reinforcing fibers for use in laminates include glass fibers and mats, carbon and graphite fibers, cellulosic paper, fibrous polyamide sheets, fibrous quartz sheets, woven fibrous glass cloth, unwoven fibrous glass mat, and the like. The epoxy resin composition will be impregnated in the reinforcing fibers or fabrics or the interstices formed from such fibers or fabrics. Fillers such as quartz powdered, mica, talc, calcium carbonate and the like may also be added to the resinous matrix in the manufacture of the laminate.

EXAMPLES

In order that those skilled in the art may more fully understand the invention presented herein, the following procedures and examples are set forth. Unless otherwise indicated, the following units of measurement and definitions apply in this application: all parts and percentages are by weight; temperatures are in degrees centigrade (° C.); and readings of vacuum are in inches of mercury.

For the following examples, the data was derived in accordance with the following procedures.

The weight average molecular weight (Mw) and number average molecular weight (Mn) herein are measured using size exclusion gel permeation chromatography (SEC) and phenolic compounds and polystyrene standards. The sample molecular weight to be measured is prepared as follows: the sample is dissolved in tetrahydrofuran and the solution is run through a gel permeation chromatograph. Any free phenolic in the sample is excluded from the calculation of molecular weight. SEC as a measure of molecular weight is highly dependant on the hydrodynamic volume of the material in solvent. Highly branched or polycyclic materials tend to give lower values than molecular weights determined by other means such as vapor phase osmometry (VPO).

The nitrogen content of the condensate is determined based on the moles of aldehyde (formaldehyde) and arylhydroxy (phenol) monomer incorporated for every mole of triazine (melamine). While the moles of aldehyde is the initial amount charged, amount of arylhydroxy monomer incorporated is obtained by subtracting the amount of non-reacted arylhydroxy monomer removed as vacuum distillate from the amount initially charged.

In this calculation, any excess arylhydroxy monomer above 2% is included as a part of non-reacted monomer. For the sake of consistency, the weight of arylhydroxy monomer incorporated is its molecular weight −1 (that is 94−1=93 for phenol) to allow loss of one hydrogen atom because of its bonding with the aldehyde. Similarly, for the triazine monomer, such as melamine, the weight incorporated is its molecular weight minus the number of moles of aldehyde tied to every mole of triazine. For example, 126−3 (if there are 3 moles of formaldehyde for every mole of melamine)=123 will be the contribution from melamine to the molecular weight of the condensate.

A closer look at Example 5 illustrates the method of calculation. The initial mole ratio of F to M is 3.0. Phenol incorporated or reacted ($P_R$) in the product for every mole of melamine is obtained as follows: {(593.5 g-417.8 g)/94.1}/0.6=3.11 where 593.5 g is the initial phenol charge, 417.8 g is the amount of phenol monomer removed and 0.6 is the total of moles of melamine charged. Therefore, the final mole ratio M:F:$P_R$=1:3.0:3.11. This amounts to a molecular mass of 123+(3*14)+(3.11*93)=454 where 14 is the molecular weight of methylene bridge that links melamine and phenol monomer. Therefore, nitrogen content in the condensate is 84/454*100=18.5 wt. % where 84 is simply the atomic weight of nitrogen multiplied by 6 as there are 6 moles of nitrogen per mole of melamine.

Determination of solubility in organic solvents, such as methyl ethyl ketone (MEK) may be described as follows. An organic solvent may have one or more functionalities selected from the group of an ether functionality, a ketone functionality, an alcohol functionality, an ester functionality, and combinations thereof, for example, a ketone solvent, an alcohol solvent, an ether solvent, a glycol ether solvent, an ester solvent, a glycol ester solvent, and combinations thereof, of which methyl ethyl ketone (MEK) is preferably used, among other solvents that are used in epoxy formulations. Suitable solvents may include methyl ethyl ketone (MEK), methyl isobutyl ketone (MIBK), acetone, methanol, isopropyl alcohol, 1 methoxy-2-propanol, and combinations thereof.

A 4-dram glass vial is charged with 1.5 g of powdered triazine-arylhydroxy-aldehyde condensate made by the processes described herein. To which is added various amounts of methyl ethyl ketone (MEK) to give solutions with different concentration. The table below gives the amounts of MEK to be added to 1.5 g of condensate to yield the desired solids level.

| MEK, g | wt. % solids |
|---|---|
| 13.5 | 10 |
| 3 | 33 |
| 2.25 | 40 |
| 1.5 | 50 |
| 1 | 60 |
| 0.65 | 70 |
| 0.38 | 80 |

For concentrations of 33% or below, the vial is capped and contents mixed at ambient temperature for 5 to 10 minutes until resin dissolves completely or no further dissolution occurs. For concentrations greater than 33% the vial is capped, sealed with insulation tape and heated in 60° C. to 70° C. oven until most of the resin is dissolved. The sample vial is then taken out and optionally mixed for 5 to 10 minutes until resin dissolves completely or no further dissolution occurs. The solubility of the condensate in MEK is noted. The vial is then allowed to sit at ambient temperature of between about 20° C. and about 25° C., and observations are made on a daily basis.

For concentrations of 33 wt. % solids or higher, the following criteria are applied to further differentiate the solubility between different resins. It is not unusual for such solutions to develop cloudiness (a stage when the solution would not allow seeing through) over time which may eventually lead to a solid circle of white coating at the bottom. It is either in the rate at which this cloudiness/precipitation occurs or if such phenomena occur at all that differentiates one resin to the other in terms of their solubility.

A triazine-arylhydroxy-aldehyde condensate is observed to exhibit excellent solubility if dissolved in an organic solvent up to 75% solids, and in some embodiments may be greater than 75% solids, such as 80 wt. % solids, and may stay dissolved for at least 120 hours before cloudiness sets in or precipitation begins in the form of flocculent or white circle at the bottom of the vial. For example, a condensate of 33 wt. % solids in a solvent was observed to remain dissolved for at least 120 hours before cloudiness sets in or precipitation begins in the form of flocculent or white circle at the bottom of the vial.

A triazine-arylhydroxy-aldehyde condensate is observed to exhibit superior solubility if dissolved in an organic solvent up to 75% solids, and in some embodiments may be greater than 75% solids, such as 80 wt. % solids, and may stay dissolved for at least 500 hours before cloudiness sets in or precipitation begins in the form of flocculent or white circle at the bottom of the vial. For example, a condensate of 33 wt. % solids in a solvent was observed to remain dissolved for at least 500 hours before cloudiness sets in or precipitation begins in the form of flocculent or white circle at the bottom of the vial.

Triazine-arylhydroxy-aldehyde condensates prepared by the high pKa process typically exhibit superior solubility, if dissolved in an organic solvent, with up to 75% solids, and in some embodiments may be greater than 75% solids, such as 80 wt. % solids, and may stay dissolved for at least 500 hours before cloudiness sets in or precipitation begins. For example, a triazine-arylhydroxy-aldehyde condensate of 33 wt. % solids in a solvent was observed to remain dissolved for at least 500 hours before cloudiness sets in or precipitation begins.

Triazine-arylhydroxy-aldehyde condensates prepared by the low pKa process typically exhibit excellent solubility, if dissolved in an organic solvent, with up to 75% solids, and in some embodiments may be greater than 75% solids, such as 80 wt. % solids, and may stay dissolved for at least 120 hours before cloudiness sets in or precipitation begins. For example, a triazine-arylhydroxy-aldehyde condensate of 33 wt. % solids in a solvent remained dissolved for at least 120 hours before cloudiness sets in or precipitation begins. In fact, many of these resins also exhibit superior solubility in spite of being held at 165° C. during production for long hours.

Determination of Melt Viscosities

Viscosities, at 175° C., were determined with a cone and plate viscometer from Research Equipment (London) Ltd. Number 40 and 100 spindles were used depending on the viscosity reading. A factor multiplier of 340 was used for the Number 40 spindle and a factor multiplier of 965 was used for the of 100 spindle values shown from digital readout. For example, a digital reading of 5 obtained with a #40 cone spindle would be multiplied by 340 to give a viscosity value of 1700 cps. Viscosities were also determined using ARES Rheometer from Rheometric Scientific. Viscosities were measured at 150° C.-200° C. using a parallel plate assembly at 1% strain with 2° C. per minute heating. The viscosity thus measured is reported in mPa·s (1 mPa·s=1 cps).

Comparisons were made between resins made by prior technology using the high basicity amine catalyst method and high temperature acid catalyst method as described in the U.S. Pat. No. 6,605,354 against those made by low pKa and high pKa processes described in this invention. For example, resins made by current invention dissolved even up to 80 wt. % solids in MEK. Whereas, the resin made by the high temperature acid catalyst method of prior art gave a cloudy liquid with insoluble precipitates even at 40 wt. % solids level. Also, while resins made by current invention stayed dissolved in MEK at 33 wt. % solids from a minimum of 120 hours to indefinite period of time, resins made by prior art turned cloudy and precipitated in the form of a circle at the bottom of the vial within 24 hours to 96 hours.

Examples of condensates formed from the components and processes described herein are as follows.

Example 1

Preparation of Melamine-Phenol-Formaldehyde Condensate

The process for Example 1 was initiated by charging 546.0 grams (g) phenol (5.80 moles), 1.1 g benzoic acid (0.2% of phenol), and 79.1 g melamine (0.63 moles) into a reaction vessel to form a reaction mixture. The reaction mixture was heated to 80° C., and 55.8 g of 50.4% aqueous formaldehyde (60% of total charge) was added over 40 minutes. The reaction mixture was atmospherically distilled while heating to 123° C., and then maintaining the 123° C. temperature for 2 hours, followed by reducing the reaction mixture temperature to 80° C. 37.2 g of 50.4% aqueous formaldehyde (40% of total charge) was added over 30 minutes to the reaction mixture and then atmospherically distilling the reaction mixture to 123° C., maintaining the temperature at 123° C. for 1.5 hours, and increasing the temperature over 45-50 minutes to 165° C. and continuing to distill atmospherically. Next, the reaction mixture was under a gradually increasing vacuum over 3 hours to a full vacuum of at least 27 inches while maintaining a temperature of 163°-165° C., then heating the reaction mixture to 175° C. over 1 hour under full vacuum, followed by maintaining the vacuum and temperature at 175° C. for 15 minutes, and then steaming the reaction mixture (or water sparge) at 175° C. for 60 minutes, and after 60 minutes, cooling the resin to 164°-167° C. in about 15 minutes. Further, the process was concluded by removing the vacuum distillate (426.6 g) and discharging the product (212.9 g) from the reaction vessel.

In this instance, no stabilizer was added as the melt viscosity of the resin was 1333 cps at 175° C. The condensate dissolved completely in MEK, acetone, THF, methanol and Dowanol PM at almost any concentration. The 33 wt. % to 60 wt. % solids remained dissolved in MEK with only trace at the bottom for instance for more than 240 hours. The 70 wt. % and 80 wt. % solids remained dissolved in MEK indefinitely.

Example 2

Preparation of Melamine-Phenol-Formaldehyde Condensate

The process for Example 2 was initiated by charging 828.0 lbs phenol (8.8 moles), 1.66 lbs benzoic acid (0.2% of phenol), and 120 lbs melamine (0.95 moles) into a reaction vessel to form a reaction mixture. The reaction mixture was heated to 80° C., and 85.4 lbs of 49.79% aqueous formaldehyde (60% of total charge) was added over 40 minutes. The reaction mixture was atmospherically distilled while increasing the temperature of the reaction mixture to 123° C., then maintaining the 123° C. temperature for 2 hours before reducing the reaction mixture temperature to 80° C. 57.2 lbs of 49.79% aqueous formaldehyde (40% of total charge) was added in over 30 minutes to the reaction mixture, followed by atmospherically distilled to 123° C., maintained at the temperature of 123° C. for 1.5 hours, and then increasing the temperature over 45-50 minutes to 165° C. and continuing to distill atmospherically. Next, the reaction mixture was under a gradually increasing vacuum over 3 hours to full vacuum of at least 27 inches while maintaining a temperature of 163°-165° C., followed by heating the reaction mixture to 175° C. over 1 hour under full vacuum, then maintaining the vacuum and temperature at 175° C. for 15 minutes before steaming the reaction mixture (or water sparge) at 175° C. for 60 minutes, and after 60 minutes cooling the resin to 164°-167° C. in about 15 minutes.

In this instance, the melt viscosity of the resin was 1983 cps at 175° C. About 3.2 lbs each of ortho and para cresol was added to the resin. The resin was held in the reactor for about 9 hours at 165° C. Further, the process was concluded by collecting the vacuum distillate (634 lbs) and discharging the product (318 lbs) from the reactor assembly. The condensate exhibited solubility similar to that of example 1. For instance, the 33 wt. % solids dissolved readily in MEK and remained dissolved for greater than 500 hours.

Example 3

Preparation of Melamine-Phenol-Formaldehyde Condensate

The process for Example 3 is initiated by charging 221.5 g phenol (2.35 moles), 31.9 g melamine (0.25 moles), 36.6 g of 50% formaldehyde (0.61 moles) into a reaction vessel to form a reaction mixture, heating the reaction mixture under distillation mode until distillation starts around 115-120° C., gradually increasing the temperature up to about 170° C. while water and phenol are removed atmospherically. Then, applying a vacuum gradually until most of non-reacted phenol is removed, and water sparging the reaction mixture at about 180° C. to reduce the phenol level to <1% in the final product. The process is concluded by removing phenol (172 g) distillate and discharging the product (87.3 g) from the reaction vessel. The recovered product exhibited a solubility of almost any concentration such as from 33 wt. % solids to 70 wt. % solids in common solvents such as MEK. Such solutions remained dissolved in a MEK for greater than 500 hours or indefinitely without precipitation.

Example 4

Preparation of Melamine-Phenol-Formaldehyde Condensate

The process for Example 4 was initiated by charging 593.5 g phenol (6.31 moles) and 75.2 g melamine (0.60 moles) into a reaction vessel to form a reaction mixture. The reaction mixture was heated to 80° C., and 53.14 g of 50.15% aqueous formaldehyde (60% of total charge) was added over 15 minutes. The reaction mixture was atmospherically distilled to 133° C., then maintained at 133° C. temperature for 2 hours, followed by reducing the reaction mixture temperature to 80° C. 35.45 g of 50.15% aqueous formaldehyde (40% of total charge) was added in about 20 minutes to the reaction mixture, then atmospherically distilling the reaction mixture to 133° C., maintained at 133° C. for 1.3 hours, and then increasing the temperature over 60 minutes to 165° C. while continuing to distill atmospherically. Next, the reaction mixture was under a gradually increasing vacuum over 2 hours to full vacuum of at least 27 inches while maintaining a temperature of 163°-165° C., and then heating the reaction mixture to 175° C. under full vacuum. Further, the process is concluded by removing the vacuum distillate (439.7 g) and discharging the product (236.7 g) from the reaction vessel. The condensate exhibited a solubility of 33% and higher solids dissolved in a solvent for 120 hours or greater.

Example 5

Preparation of Melamine-Phenol-Formaldehyde Condensate

The process for Example 5 was initiated by charging 593.5 g phenol (6.31 moles), 4.3 g of acetic acid (0.72% of phenol) and 75.2 g melamine (0.60 moles) into a reaction vessel to form a reaction mixture. The reaction mixture was heated to 80° C., and 64.1 g of 50.3% aqueous formaldehyde (60% of total charge) was added in over 20 minutes. The reaction mixture went under atmospherically distilling to 123° C., then maintained at 123° C. for 2 hours followed by reducing the reaction mixture temperature to 80° C. 42.5 g of 50.3% aqueous formaldehyde (40% of total charge) was added over about 20 minutes to the reaction mixture, followed by atmospherically distilling the reaction mixture to 123° C., then maintaining the temperature at 123° C. for 1.6 hours, and finally increasing the temperature over 60 minutes to 165° C. and continuing to distill atmospherically. Next, the reaction mixture was under a gradually increasing vacuum over 2 hours to full vacuum of at least 27 inches while maintaining a temperature of 163°-165° C., and then heating the reaction mixture to 175° C. under full vacuum. Further, the process is concluded by removing the vacuum distillate (417.8 g) and discharging the product (263.0 g) from the reaction vessel.

Similar to Example 3, the recovered product exhibited a solubility of almost any concentration such as from 33 wt. % solids to 70 wt. % solids in common solvents mentioned earlier such as MEK. For example, the condensate exhibited a solubility of 33% and higher solids dissolved in MEK for greater than 500 hours or indefinitely.

Example 6

Preparation of Melamine-Phenol-Formaldehyde Condensate

The process for Example 6 was initiated by charging 593.5 g phenol (6.31 moles), 1.2 g of benzoic acid (0.2% of phenol) and 75.2 g melamine (0.60 moles) into a reaction vessel to form a reaction mixture. The reaction mixture was heated to 80° C. and 64.1 g of 50.3% aqueous formaldehyde (60% of total charge) was added over 26 minutes. The reaction mixture was atmospherically distilled to 123° C., maintained at 123° C. for 2 hours, and then reduced to 80° C. 42.5 g of 50.3% aqueous formaldehyde (40% of total charge) was added over about 17 minutes to the reaction mixture, and then atmospherically distilled to 123° C., and then maintaining the temperature at 123° C. for 1.4 hours followed by increasing the temperature over 50 minutes to 165° C. and continuing to distill atmospherically. Next, the reaction mixture was under a gradually increasing vacuum over 2 hours to full vacuum of at least 27 inches while maintaining a temperature of 163°-165° C., followed by heating the reaction mixture to 175° C. under full vacuum. Further, the process is concluded by removing the vacuum distillate (413.7 g) and discharging the product (261.2 g) from the reaction vessel.

Similar to example 3, the recovered product exhibited a solubility of almost any concentration such as from 33 wt. % solids to 70 wt. % solids in common solvents mentioned earlier such as MEK. For example, the condensate exhibited a solubility of 33% and higher solids dissolved in MEK beyond 500 hours or indefinitely.

Example 7

Preparation of Melamine-Phenol-Formaldehyde Condensate

The process for Example 7 was initiated by charging 593.4 g phenol (6.31 moles) and 0.86 g of triethylamine into a reaction vessel to form a reaction mixture. The reaction mixture was heated to 75° C., and 75.6 g melamine (0.60 moles) was added and mixed for 15 minutes. 53.81 g of 50.17% aqueous formaldehyde (50% of total charge) was added over 30 minutes. 53.61 g of 50.17% aqueous formaldehyde (50% of total charge) was added over 32 minutes. The reaction mixture was maintained at 75° C. for 2 hours and then heated to 85° C. before maintaining the temperature for 30 minutes. The reaction mixture was atmospherically distilled to 110° C. and the temperature was maintained at 110° C. for 3 hours, before reducing the reaction mixture temperature to 100° C. under reflux mode. 4.21 g of benzoic acid slowly over 10 minutes was added and mixed for over 5 minutes. The reaction mixture was then atmospherically distilled to 110° C. and the temperature maintained at 110° C. for 2 hours. The reaction mixture was then atmospherically distilled to 150° C. and the temperature maintained at 150° C. for 2 hours before increasing the temperature to 165° C. while continuing to distill atmospherically. Next, the reaction mixture was under a gradually increasing vacuum over 1.5 hours to full vacuum of at least 27 inches while maintaining a temperature of 163°-165° C. before heating the reaction mixture to 175° C. under full vacuum. Further, the process was concluded by discharging the product (293.6 g) and the vacuum distillate (383.4 g) from the reaction vessel.

The condensate exhibited solubility in variety of common solvents described herein. Particularly, the 33% solids in MEK solution remained clear with only a trace for greater than 408 hours and the 75% solids in MEK remained clear for greater than 500 hours or indefinitely.

Example 8

Preparation of Melamine-Phenol-Formaldehyde Condensate

The process for Example 8 was initiated by charging 593.5 g phenol (6.31 moles), 1.2 g of benzoic acid (0.2% of phenol) and 75.2 g melamine (0.60 moles) into a reaction vessel to form a reaction mixture. The reaction mixture was heated to 80° C. and 68.7 g of 50.1% aqueous formaldehyde (60% of total charge) was added in over 30 minutes. The reaction mixture was atmospherically distilled to 123° C., and then maintaining the 123° C. temperature for 2 hours before reducing the reaction mixture temperature to 80° C. 45.8 g of 50.1% aqueous formaldehyde (40% of total charge) was added over about 15 minutes to the reaction mixture, followed by atmospherically distilling the reaction mixture to 123° C., maintaining the temperature at 123° C. for 1.5 hours, and then increasing the temperature over 50 minutes to 165° C. and continuing to distill atmospherically. Next, the reaction mixture was under a gradually increasing vacuum over 2 hours to full vacuum of at least 27 inches while maintaining a temperature of 163°-165° C. before heating the reaction mixture to 175° C. under full vacuum. Further, the process is concluded by removing the vacuum distillate (395.0 g) and discharging the product (279.2 g) from the reaction vessel.

The product exhibited superior solubility in most solvents. For example the 33% and higher solids remained dissolved in MEK beyond 500 hours and indefinitely.

Example 9A

Preparation of HMMM-Phenol-Condensate

The process for Example 9A is initiated by charging 49.2 g of HMMM (0.126 moles), 162.8 g phenol (1.73 moles) into a reaction vessel to form a reaction mixture, heating the reaction mixture under distillation mode until distillation starts around 155-160° C., gradually increasing the temperature up to about 180° C. while water and phenol are removed atmospherically. Then applying a vacuum gradually until most of non-reacted phenol is removed at about 180° C. to reduce the phenol level to <2% in the final product. The process is concluded by removing the vacuum distillate (129.0 g) and discharging the product (55.8 g) from the reaction vessel. The recovered product was found to dissolve readily at 33 wt. % to 70 wt. % solids dissolved in a solvent such as MEK and was observed to remain dissolved in MEK solution for 500 hours or indefinitely without precipitation. This composition is believed to be a self-curing condensate composition.

The following Example 9B is a comparative example of a prior art process for forming a condensate that illustrates the reduced solubility using a strong acid in comparison to the improved solubility of a process using a acid catalyst having a pKa value of greater than 3.8. The prior art reaction shown in the following Example 9B involves the use of a strong sulfonic acid, phenol, and HMMM. The strong sulfonic acid, such as methane sulfonic acid (MSA) catalyst, has a negative pKa value of −2.0.

Example 9B

Preparation of HMMM-Phenol-Condensate

The process for Example 9B is initiated by charging 99.9 g of HMMM (0.256 moles), 326.9 g phenol (3.47 moles), 3.6 g of MSA into a reaction vessel to form a reaction mixture, heating the reaction mixture under distillation mode until distillation starts around 110° C., gradually increasing the temperature up to about 180° C. while water and phenol are removed atmospherically. Then, applying a vacuum gradually until most of non-reacted phenol is removed at about 200° C. to reduce the phenol level to <1% in the final product. The process is concluded by removing the vacuum distillate (about 167.9 g) and discharging the product (220 g) from the reaction vessel. The recovered product was found to dissolve at 33 wt. % solids in MEK and was observed to remain dissolved for less than 120 hours before which the solutions turned cloudy with significant precipitate floating at the bottom of the vial.

Example 10

Preparation of HMMM-p-cresol-Condensate

The process for Example 10 is initiated by charging 182.2 g of HMMM (0.47 moles), 298.7 g p-cresol (2.76 moles) into a reaction vessel to form a reaction mixture, heating the reaction mixture under distillation mode until distillation starts around 139° C., gradually increasing the temperature up to about 175° C. while methanol is removed atmospherically. Then, applying vacuum gradually and increasing the temperature to about 185° C. until most of non-reacted p-cresol is removed in the final product. The process is concluded by removing atmospheric and vacuum distillate (102.8 g, which includes about 90.2 g methanol) and discharging the product (364.7 g) from the reaction vessel.

The condensate was found to exhibit self-curing like behavior as evident from significant viscosity increase when held at 175° C. for longer duration. The condensate was found to dissolve readily even at 33% for 120 hours as well as 60 wt. % solids indefinitely in MEK without precipitation. Although the 60% wt. % solids was trace-free, whereas the 33% had a small trace at the bottom.

EXAMPLE 11A and 11B are a comparative example of a prior art process compared with a process for forming a condensate as described herein.

Preparation of Melamine-Phenol-Formaldehyde (MPF) Condensate based on U.S. Pat. No. 6,605,354.

This process is the manufacturing example 29 in the patent, except that the M:F mole ratio was kept at 2.7 instead of 3 and non-reacted phenol was distilled at 175° C. instead of 190° C.

In the comparative Example 11A, a process includes charging 593.5 g phenol (6.307 moles), 1.2 g oxalic acid (first pKa value of 1.2; 0.2% of phenol), and 75.2 g melamine (0.597 moles) into a reaction vessel to form a reaction mixture. The reaction mixture was then heated to 80° C. and 57.9 g of 50.16% aqueous formaldehyde was added over in 24 minutes. The reaction mixture was atmospherically distilled to 123° C., maintained at 123° C. temperature for 2 hours, and then the reaction mixture temperature was reduced to 80° C. 38.6 g of 50.16% aqueous formaldehyde was added over 20 minutes to the reaction mixture and then atmospherically distilled to 123° C., then maintaining the temperature at 123° C. for 1.5 hours, and followed by increasing the temperature over 45-50 minutes to 165° C. and continuing to distill atmospherically. Next, the reaction mixture was under a gradually increasing vacuum over 2 hours to full vacuum of 29 inches while maintaining a temperature of 163°-165° C., and then heating the reaction mixture to 175° C. over 1 hour under full vacuum. Further, discharging the product (246.8 g) and the vacuum distillate (423.0 g) from the reaction vessel.

The condensate exhibited poor solubility in MEK. It formed a cloudy solution in the beginning, which resulted in white insoluble precipitate that settled at the bottom within a few hours. A TPA condensate is described as having a poor solubility if it does not completely dissolve even at 33% or less solids in an organic solvent and may leave a thick white precipitate at the bottom instantly.

In comparison Example 11B, a condensate from a process described herein includes charging 593.5 g phenol (6.307 moles), 1.2 g benzoic acid (pKa value of 4.2; 0.2% of phenol), and 75.2 g melamine (0.597 moles) into a reaction vessel to form a reaction mixture. The reaction mixture was heated to 80° C., and 57.9 g of 50.16% aqueous formaldehyde was added over 24 minutes. Then, the reaction mixture was atmospherically distilled mixture to 123° C., then maintained at 123° C. temperature for 2 hours followed by reducing the reaction mixture temperature to 80° C. 38.6 g of 50.16% aqueous formaldehyde was added over 20 minutes to the reaction mixture followed by atmospherically distilling the reaction mixture to 123° C., maintaining the temperature at 123° C. for 1.5 hours, and increasing the temperature over 45-50 minutes to 165° C. and continue to distill atmospherically. Next, the reaction mixture was under a gradually increasing vacuum over 2 hours to full vacuum of 29 inches while maintaining a temperature of 163°-165° C., heating the reaction mixture to 175° C. over 1 hour under full vacuum. Further, discharging the product (244.0 g) and the vacuum distillate (428.0 g) from the reaction vessel.

The condensate exhibited superior solubility in MEK. The condensate remained soluble for an indefinite period of time.

The properties of the resins in examples 1-11B are given below in Table 1.

Table I: Properties of triazine-phenol-aldehyde condensates are summarized below:

TABLE I

| Example | Melt Viscosity at 175° C., cps | Arylhydroxy monomer, % | Mw | Mn | Mw/Mn | Nitrogen calcd. % |
|---|---|---|---|---|---|---|
| 1 | 1365 | 0.75 | 448 | 315 | 1.42 | 24.3 |
| 2 | 1560 | 0.48 | 472 | 327 | 1.44 | 23.1 |
| 3 | 2602* | 0.84 | 622 | 375 | 1.66 | 23.7 |
| 4 | 1037 | 0.29 | 417 | 308 | 1.35 | 20.5 |
| 5 | 1966 | ND | 533 | 353 | 1.51 | 18.5 |
| 6 | 1740 | 0.69 | 552 | 363 | 1.52 | 18.5 |
| 7 | 340 | 0.52 | 467 | 317 | 1.48 | 16.5 |
| 8 | 1966 | 0.76 | 601 | 382 | 1.57 | 17.0 |
| 9A | 1788, 1938* | 1.90 | 1097 | 511 | 2.15 | 17.9 |
| 9B Comparative Example | 1040, 935* | 0.57 | 607 | 326 | 1.56 | 10.3 |
| 10 | 1003 | 3.0** | 1845 | 651 | 2.84 | 10.4 |
| 11A Comparative Example | 1674 | 0.81 | 475 | 340 | 1.40 | 19.1 |
| 11B Comparative Example-current invention | 2178 | 0.15 | 500 | 347 | 1.44 | 19.2 |

*mPa · s;
ND = None Detected;
**Obtained by SEC while others were obtained by Gas Chromatograph The processes described herein were scaled up to pilot plant size batches, and the following data was generated indicating that the processes described herein had effective scalability from laboratory scale to plant scale. The results of three pilot batches are given below in Tables II and Tables III. Entries Number 1 and 2 are formed using the process in Example 2, with different heating times. Entry number 3 is formed by the process as recited in Example 1.

TABLE II

| Entry Number | Hours held at 165 C. | Phenol, % | Melt viscosity cps | Hours remained dissolved for 33% solids and above |
|---|---|---|---|---|
| 1 | 12.3 | 0.64 | 1560 | 528 |
| 2 | 16.8 | 0.67 | 1560 | 120 to 144 |
| 3 | 4.7 | 0.77 | 1333 | >504 |

TABLE III

| Entry Number | Melt viscosity after phenol removal, cps | Hours held at 165 C. after removal | Melt viscosity of the final resin, cps | % Increase in viscosity from the time of phenol removal to final |
|---|---|---|---|---|
| 1 | 1333 | 9 | 1560 | 17 |
| 2 | 1430 | 12 | 1560 | 9 |

Thus stability of these resins are clearly elucidated by these pilot scale-ups, where in the viscosity increase during processing is less than 20% in one case and less than 10% in the other while the solubility rating in MEK was Superior for entry #1 and entry #3 with less heat history and Excellent for entry #2 with longer heating time.

While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

What is claimed is:

1. A condensation product of a reaction mixture, comprising:
    a triazine monomer;
    an arylhydroxy monomer selected from the group consisting of phenol, xylenols, bisphenols, alkylated bisphenols, alkoxyphenols, dihydroxy benzene, naphthols, biphenols, alkylated biphenols, trisphenols, and combinations thereof;
    an aldehyde monomer; and
    an acid catalyst having a pKa value range from 4 to 6, wherein the acid catalyst comprises an organic acid selected from the group of benzoic acid, o-aminobenzoic acid, p-aminobenzoic acid, 3,4-dihydroxybenzoic acid, 3,5-dihydroxybenzoic acid, ethylbenzoic acid, hexahydrobenzoic acid, m-hydroxybenzoic acid, p-hydroxybenzoic acid, iso-propylbenzoic acid, meta-toluic acid, para-toluic acid, and combinations thereof,
    wherein the condensation product comprises greater than 10 wt. % to about 28 wt % of nitrogen and a melt viscosity from about 1100 cps to less than 3,000 cps at 175° C.

2. The condensation product of claim 1, wherein the reaction mixture further comprises a stabilizer selected from the group consisting of cresol, N-methyl pyrrolidone, hydroquinone, triethylcitrate, butyrolactone, glycerol, and combinations thereof.

3. The condensation product of claim 2, wherein the the reaction mixture comprises from 0.1 wt. % to 2 wt. % of the reaction mixture of the stabilizer.

4. The condensation product of claim 2, wherein the cresol comprises o-cresol, p-cresol, or combinations thereof.

5. The condensation product of claim 1, wherein the reaction mixture comprises:
    the triazine monomer;
    from about 3 to about 30 moles of the arylhydroxy monomer for each mole of the triazine monomer;
    from about 1 to about 6 moles of the aldehyde monomer for each mole of the triazine monomer; and
    from greater than 0.1 wt. % to less than 1 wt. %, based on the weight of the arylhydroxy monomer, of the acid catalyst.

6. The condensation product of claim 1, wherein the condensation product maintains a Gardner number of less than 3 for 150 days or greater.

7. The condensation product of claim 1, wherein the condensation product comprises a melt viscosity from about 1100 cps to about 1700 cps at 175° C.

8. The condensation product of claim 1, wherein the triazine monomer comprises a structure having the formula:

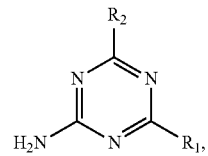

wherein R₁ and R₂ are each independently a hydrogen atom or a functional group selected from the group consisting of an amino group, an alkyl group having 1 to 4 carbon atoms, phenyl group, a vinyl group, and combinations thereof.

9. The condensation product of claim 1, wherein the triazine monomer and the aldehyde monomer comprise an aldehyde modified triazine monomer.

10. The condensation product of claim 1, wherein the reaction mixture further comprises one or more organic solvents having one or more functionalities selected from the group consisting of an ether functionality, a ketone functionality, an alcohol functionality, an ester functionality, and combinations thereof.

11. A method for the preparation of the condensation product of claim 1, comprising:
    charging to a reaction vessel to form a reaction mixture:
        the triazine monomer;
        from about 3 to about 30 moles of the arylhydroxy monomer for each mole of the triazine monomer;
        from about 1 to about 6 moles of the aldehyde monomer for each mole of the triazine monomer; and
        the acid catalyst; and
    heating the reaction mixture to a temperature of about 120° C. to about 165° C. and substantially completing reaction of the arylhydroxy monomer in the reaction mixture.

12. The method of claim 11, wherein the triazine monomer and the aldehyde monomer comprise an aldehyde modified triazine monomer.

13. The method of claim 12, wherein the aldehyde modified triazine monomer comprises hexamethoxymethylmelamine.

14. The method of claim 11, further comprising charging a stabilizer or one or more organic solvents selected from the group consisting of cresol, N-methyl pyrrolidone, hydroquinone, triethylcitrate, butyrolactone, glycerol, and combinations thereof.

15. The method of claim 11, further comprising charging a base catalyst to the reaction vessel before heating the reaction mixture.

16. The condensation product of claim 1, wherein the condensation product comprises a solubility from about 33% to at least about 80 wt. % solids dissolved for 120 hours or greater in one or more organic solvents having one or more functionalities selected from the group consisting of an ether functionality, a ketone functionality, an alcohol functionality, an ester functionality, and combinations thereof.

17. A flame-retardant epoxy resin composition, comprising:
    an epoxy resin; and
    a condensation product of a reaction mixture comprising:
        a triazine monomer;
        an arylhydroxy monomer selected from the group consisting of phenol, xylenols, bis-phenols, alkylated bisphenols, alkoxyphenols, dihydroxy benzene, naphthols, biphenols, alkylated biphenols, trisphenols, and combinations thereof;
        an aldehyde monomer; and
        an acid catalyst having a pKa value range from 4 to 6, wherein the acid catalyst comprises an organic acid selected from the group of benzoic acid, o-aminobenzoic acid, p-aminobenzoic acid, 3,4-dihydroxybenzoic acid, 3,5-dihydroxybenzoic acid, ethylbenzoic acid, hexahydrobenzoic acid, m-hydroxybenzoic acid, p-hydroxybenzoic acid, iso-propylbenzoic acid, meta-toluic acid, para-toluic acid, and combinations thereof,
    wherein the condensation product comprises greater than 10 wt. % to about 28 wt. % of nitrogen and a melt viscosity from about 1100 cps to less than 3,000 cps at 175° C.

18. The epoxy resin composition of claim 17, wherein the epoxy resin composition is free of a separate amine catalyst or a phosphorous containing catalyst.

19. The epoxy resin composition of claim 17, wherein the reaction mixture further comprises a stabilizer selected from the group consisting of cresol, N-methyl pyrrolidone, hydroquinone, triethylcitrate, butyrolactone, glycerol, and combinations thereof.

20. The epoxy resin composition of claim 19, wherein the cresol comprises o-cresol, p-cresol, or combinations thereof.

21. The epoxy resin composition of claim 17, wherein the reaction mixture comprises:
    the triazine monomer;
    from about 3 to about 30 moles of the arylhydroxy monomer for each mole of the triazine monomer;
    from about 1 to about 6 moles of the aldehyde monomer for each mole of the triazine monomer; and
    from greater than 0.1 wt. % to less than 1 wt. %, based on the weight of the arylhydroxy monomer, of the acid catalyst.

22. The epoxy resin composition of claim 17, further comprising a phenolic-formaldehyde novolac curing agent selected from the group consisting of phenol novolac, cresol novolac, naphthol novolac, bisphenol A novolac, phenol-glyoxal condensate, and combinations thereof and co-polymers thereof.

23. The epoxy resin composition of claim 17, wherein the triazine monomer comprises a structure having the formula:

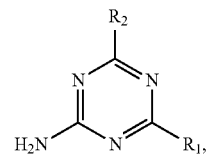

wherein R₁ and R₂ are each independently a hydrogen atom or a functional group selected from the group consisting of an amino group, an alkyl group having 1 to 4 carbon atoms, phenyl group, a vinyl group, and combinations thereof.

24. The epoxy resin composition of claim 17, wherein the condensation product comprises a solubility from about 33% to at least about 80 wt. % solids dissolved for 120 hours or greater in one or more organic solvents having one or more functionalities selected from the group consisting of an ether functionality, a ketone functionality, an alcohol functionality, an ester functionality, and combinations thereof.

* * * * *